United States Patent
Miura

(10) Patent No.: US 10,386,707 B2
(45) Date of Patent: Aug. 20, 2019

(54) ILLUMINATING UNIT AND PROJECTION DISPLAY APPARATUS

(71) Applicant: SONY CORPORATION, Tokyo (JP)

(72) Inventor: Koji Miura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 28 days.

(21) Appl. No.: 15/506,889

(22) PCT Filed: Aug. 12, 2015

(86) PCT No.: PCT/JP2015/072866
§ 371 (c)(1),
(2) Date: Feb. 27, 2017

(87) PCT Pub. No.: WO2016/042952
PCT Pub. Date: Mar. 24, 2016

(65) Prior Publication Data
US 2018/0231882 A1    Aug. 16, 2018

(30) Foreign Application Priority Data

Sep. 17, 2014 (JP) ................. 2014-189019

(51) Int. Cl.
| | |
|---|---|
| *G03B 21/20* | (2006.01) |
| *H04N 9/31* | (2006.01) |
| *G03B 21/00* | (2006.01) |
| *G03B 21/14* | (2006.01) |
| *H04N 5/74* | (2006.01) |
| *G02B 27/14* | (2006.01) |

(52) U.S. Cl.
CPC ......... *G03B 21/2013* (2013.01); *G02B 27/14* (2013.01); *G02B 27/141* (2013.01);
(Continued)

(58) Field of Classification Search
CPC ............ G03B 21/2013; G03B 21/2073; G03B 21/2033; H04N 9/3164; H04N 9/3167
See application file for complete search history.

(56) References Cited

U.S. PATENT DOCUMENTS

| | | | | |
|---|---|---|---|---|
| 2012/0133901 A1* | 5/2012 | Miura | ................ | G03B 21/2013 353/31 |
| 2012/0182525 A1* | 7/2012 | Imai | .................. | G03B 21/2033 353/20 |

FOREIGN PATENT DOCUMENTS

| | | |
|---|---|---|
| CN | 101825830 A | 9/2010 |
| CN | 102540677 A | 7/2012 |

(Continued)

OTHER PUBLICATIONS

International Search Report and Written Opinion of PCT Application No. PCT/JP2015/072866, dated Nov. 10, 2015, 06 pages of English Translation and 06 pages of ISRWO.

(Continued)

*Primary Examiner* — Ryan D Howard
(74) *Attorney, Agent, or Firm* — Chip Law Group

(57) ABSTRACT

An illuminating unit of the disclosure includes a light source, a plurality of optical members for illumination that guide light from the light source to a predetermined optical path, and a polarization split element that transfers, to a predetermined illuminating position, a first polarized component included in the light guided to the predetermined optical path. One or more of the plurality of optical members for illumination have optical properties, for the light at a predetermined wavelength band outputted from the light source, of guiding the first polarized component to the predetermined optical path, and guiding a second polarized component that is different from the first polarized component toward a direction deviated from the predetermined optical path.

7 Claims, 22 Drawing Sheets

(52) U.S. Cl.
CPC ............. *G03B 21/00* (2013.01); *G03B 21/14* (2013.01); *G03B 21/2033* (2013.01); *G03B 21/2066* (2013.01); *G03B 21/2073* (2013.01); *H04N 5/74* (2013.01); *H04N 9/3105* (2013.01); *H04N 9/3167* (2013.01)

(56) References Cited

FOREIGN PATENT DOCUMENTS

| | | |
|---|---|---|
| CN | 102549492 A | 7/2012 |
| EP | 2472316 A1 | 7/2012 |
| JP | 10-133277 A | 5/1998 |
| JP | 2003-098483 A | 4/2003 |
| JP | 2008-203493 A | 9/2008 |
| JP | 3174811 U | 4/2012 |
| JP | 2012-118122 A | 6/2012 |
| WO | 2010/099708 A1 | 9/2010 |
| WO | 2011/037057 A1 | 3/2011 |

OTHER PUBLICATIONS

International Preliminary Report on Patentability of PCT Application No. PCT/JP2015/072866, dated Mar. 30, 2017, 07 pages of English Translation and 03 pages of IPRP.

\* cited by examiner

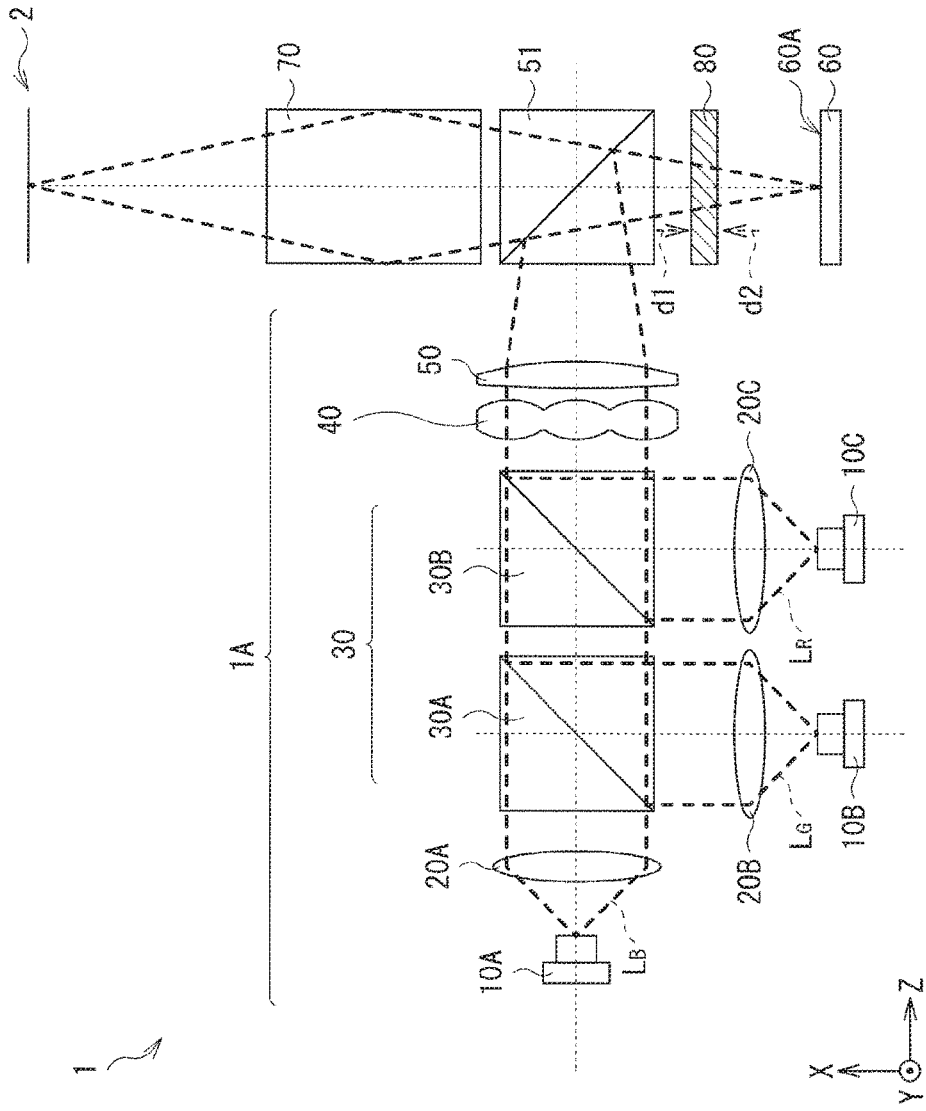
[FIG. 1]

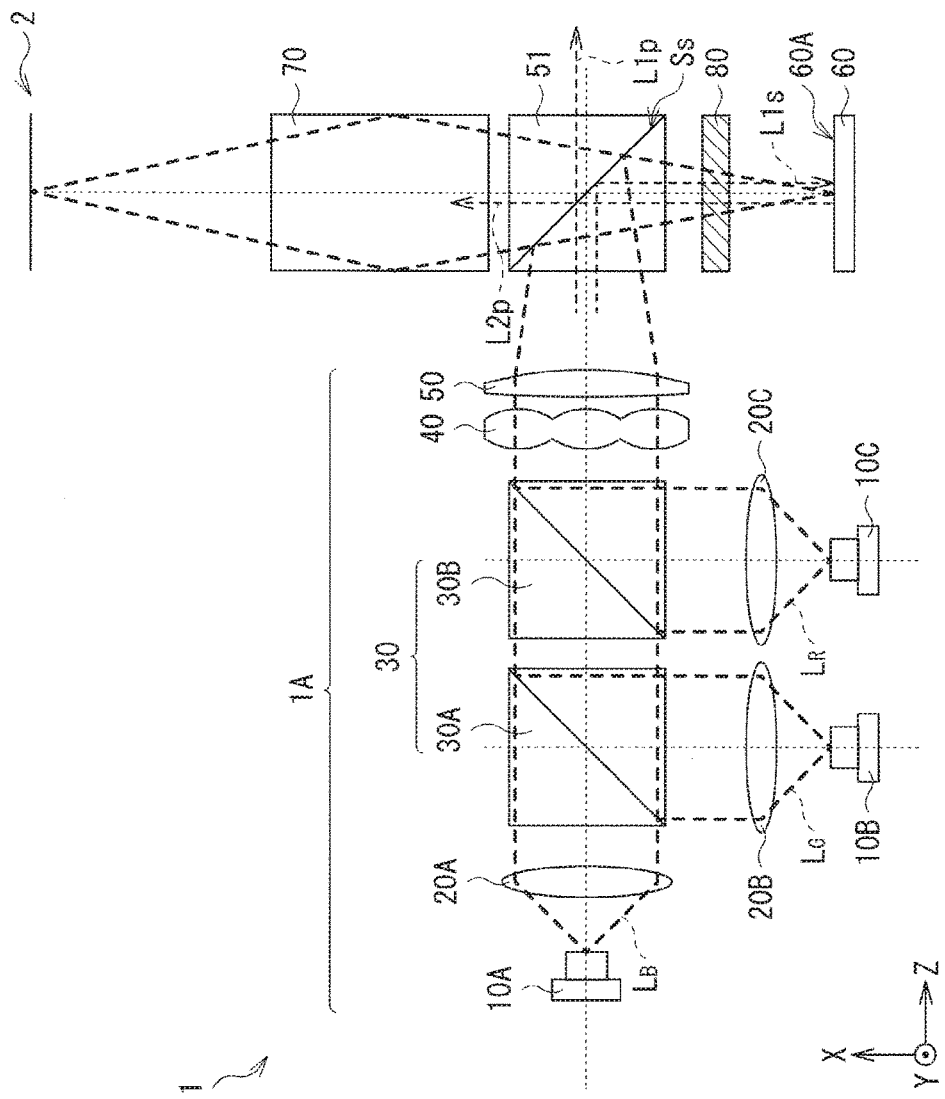
[FIG. 2]

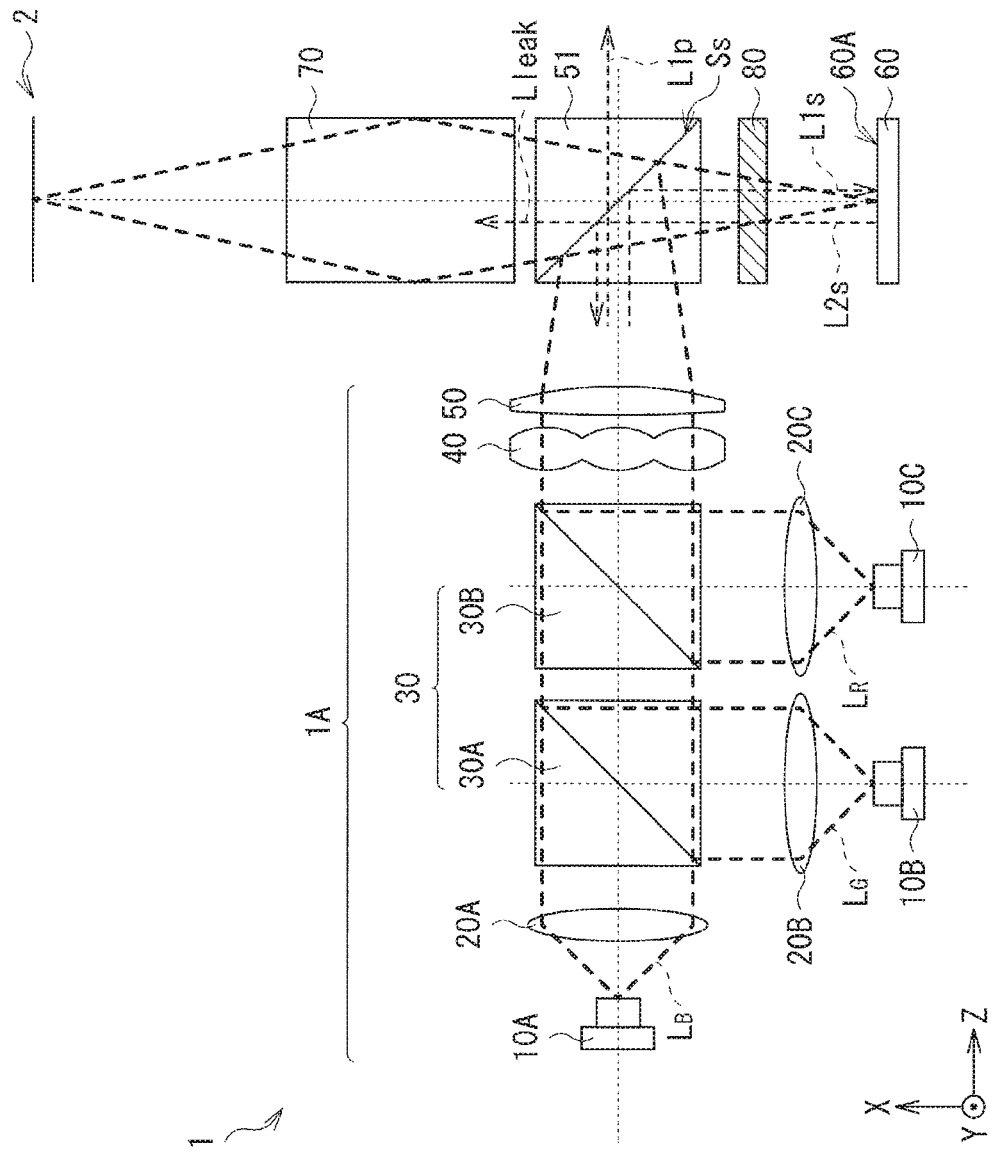
[FIG. 3]

[ FIG. 4 ]
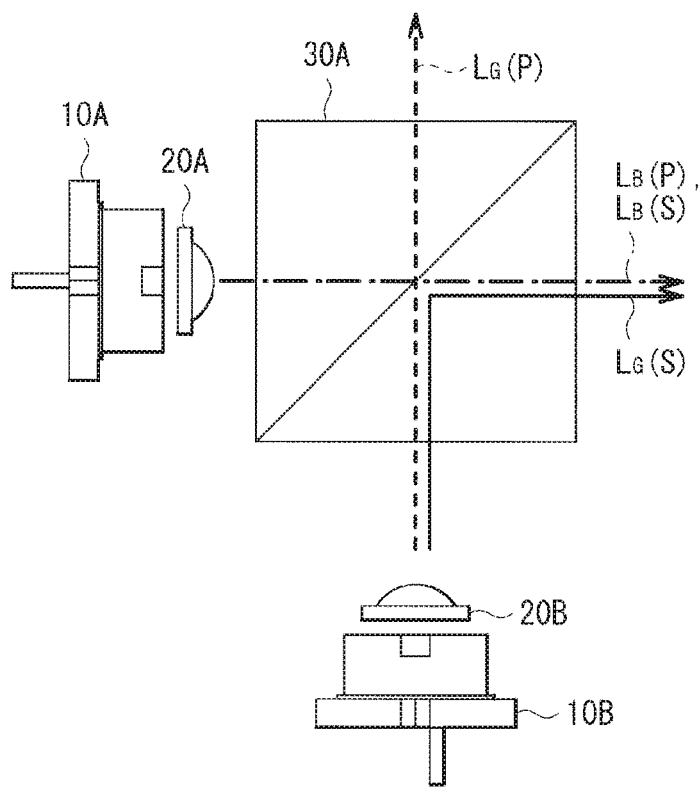

[ FIG. 5 ]
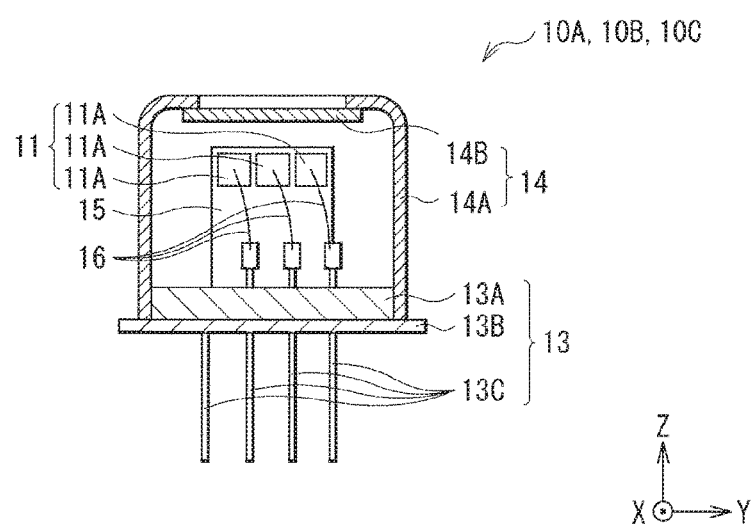
[ FIG. 6 ]
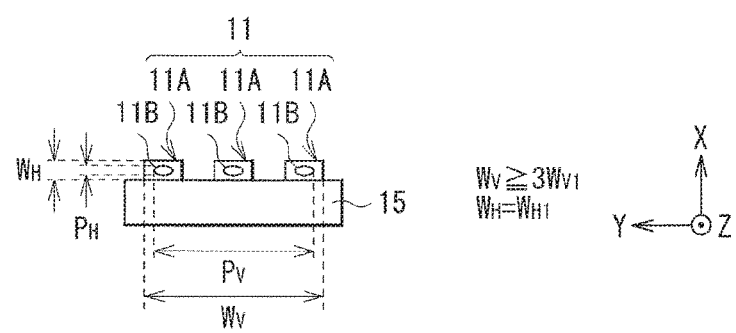
$W_V \geqq 3W_{V1}$
$W_H = W_{H1}$

[ FIG. 7 ]
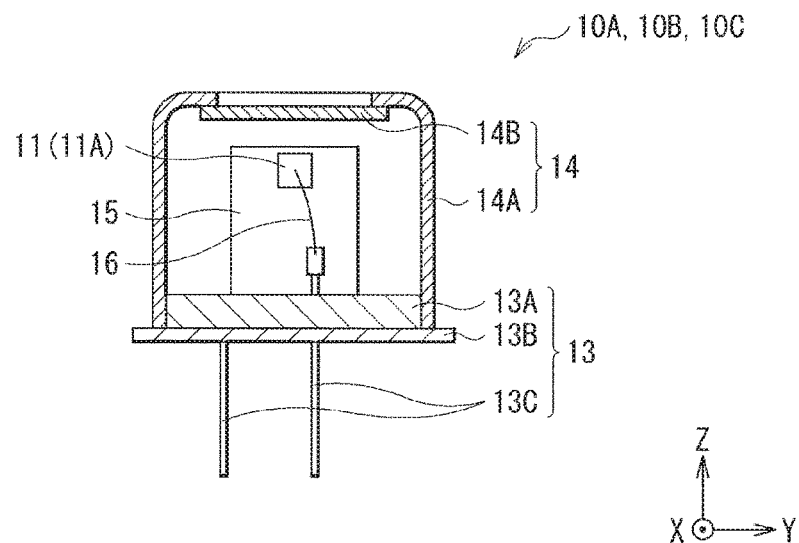
[ FIG. 8 ]
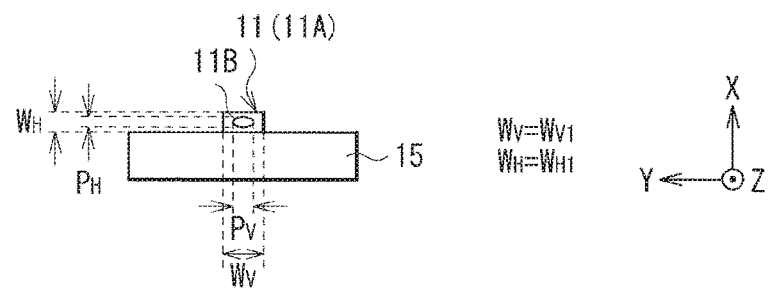
[ FIG. 9 ]
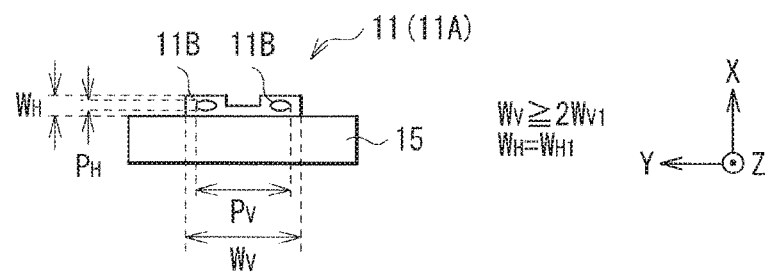

[ FIG. 10 ]
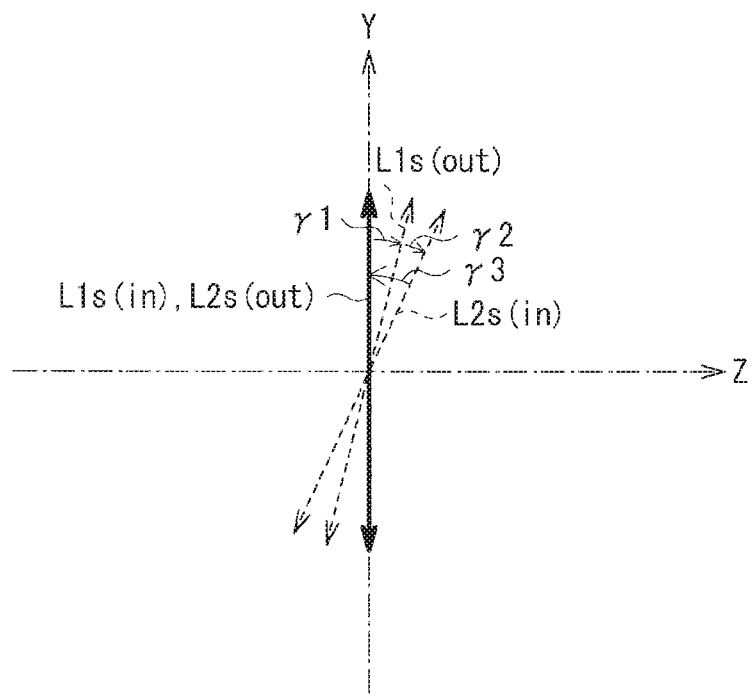

[FIG. 11]
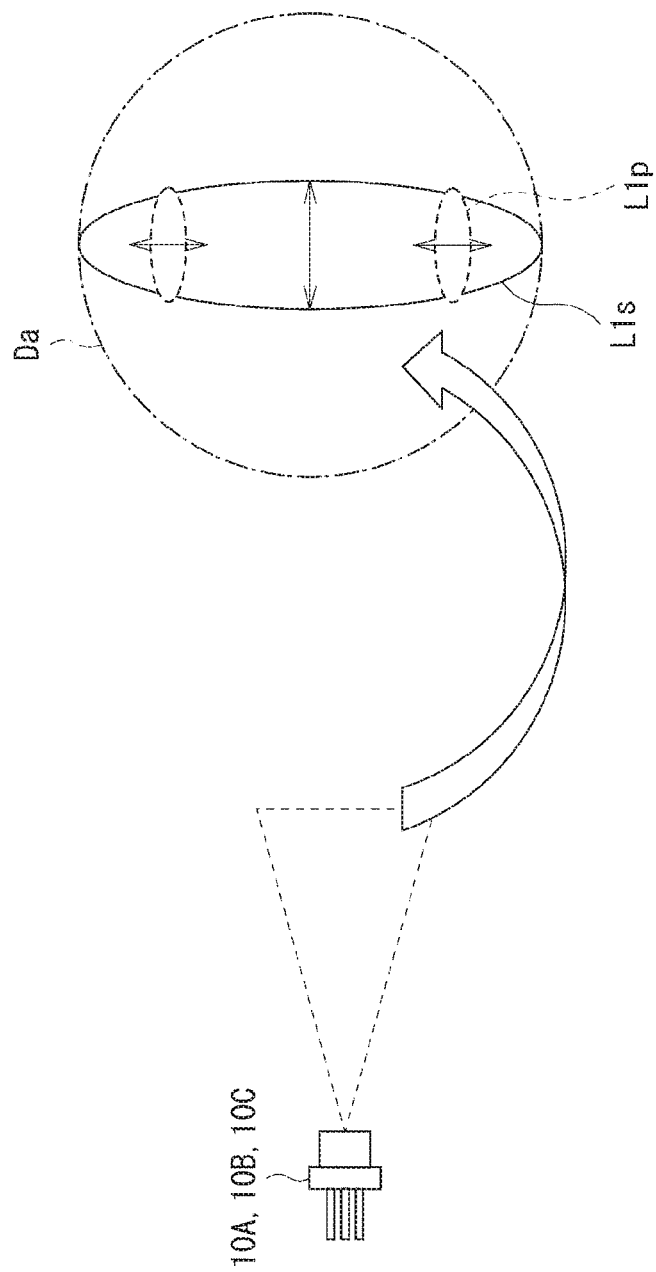

[ FIG. 12 ]
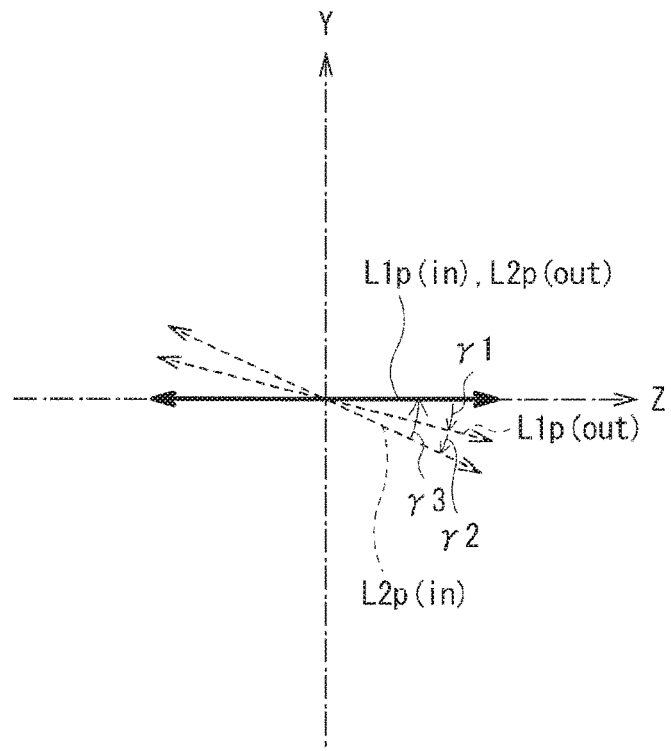
[ FIG. 13 ]
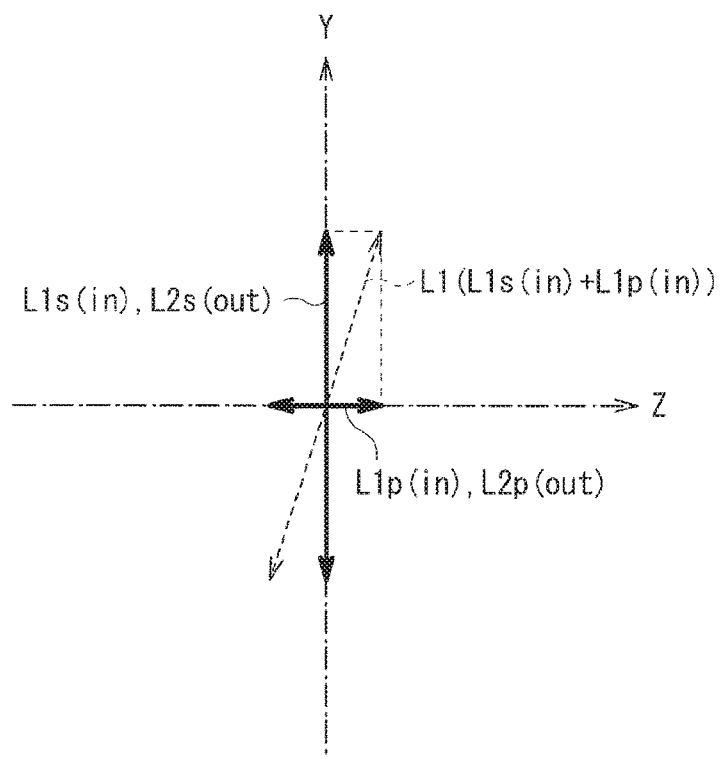

[ FIG. 14 ]
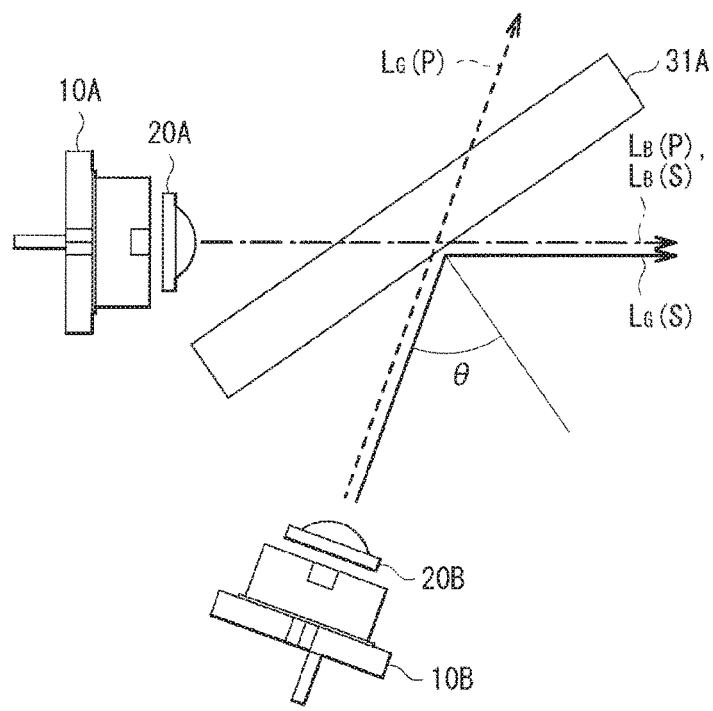
[ FIG. 15 ]
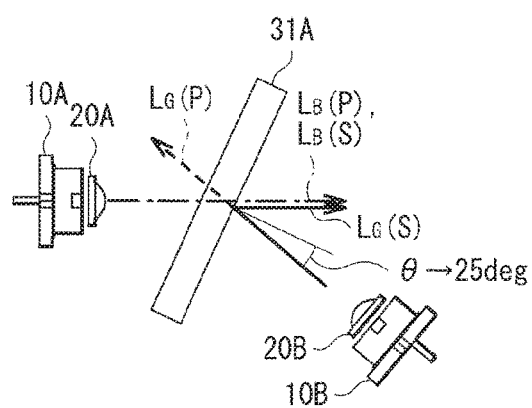

[ FIG. 16 ]
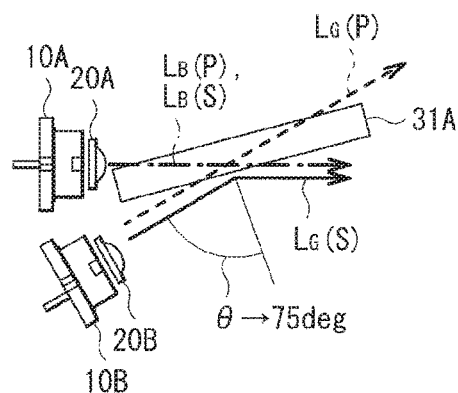
[ FIG. 17 ]
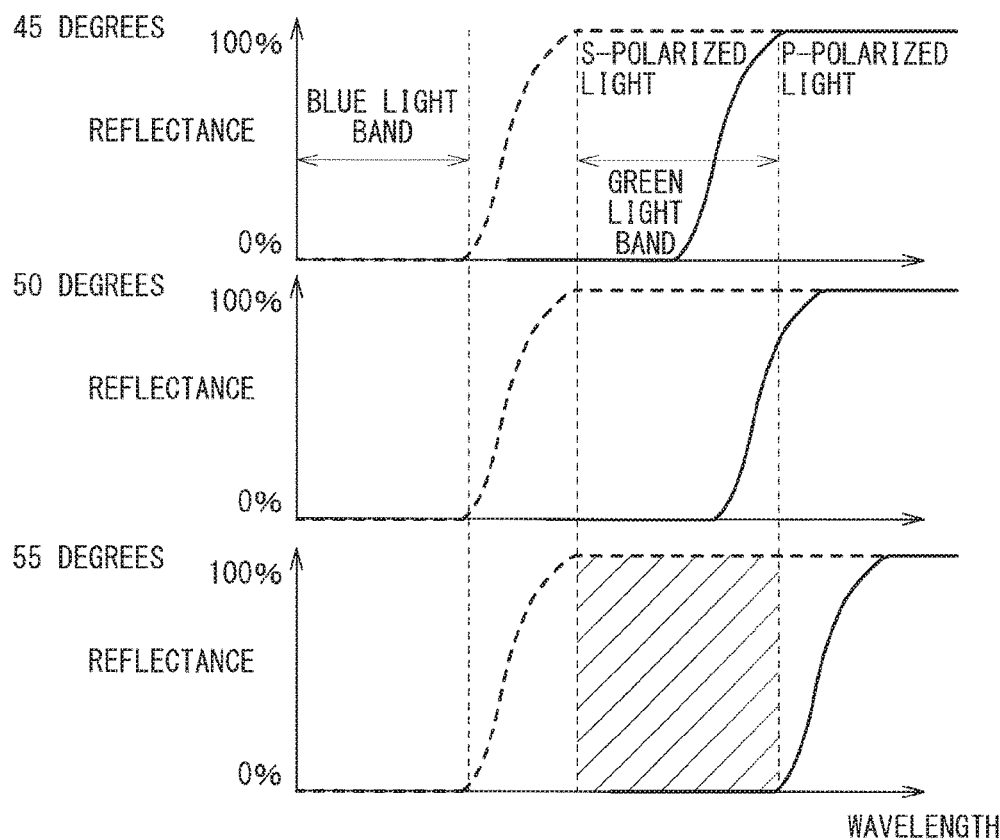

[ FIG. 18 ]
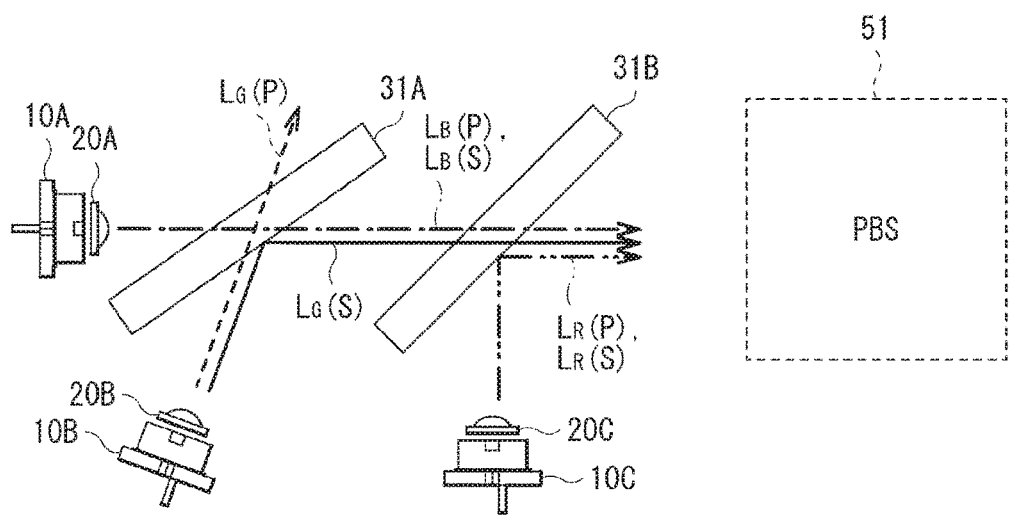
[ FIG. 19 ]
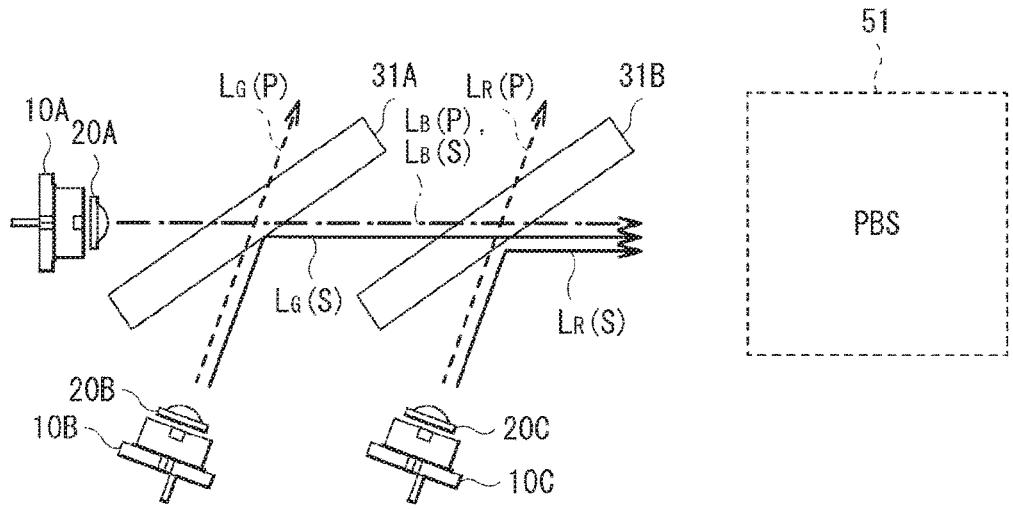

[ FIG. 20 ]
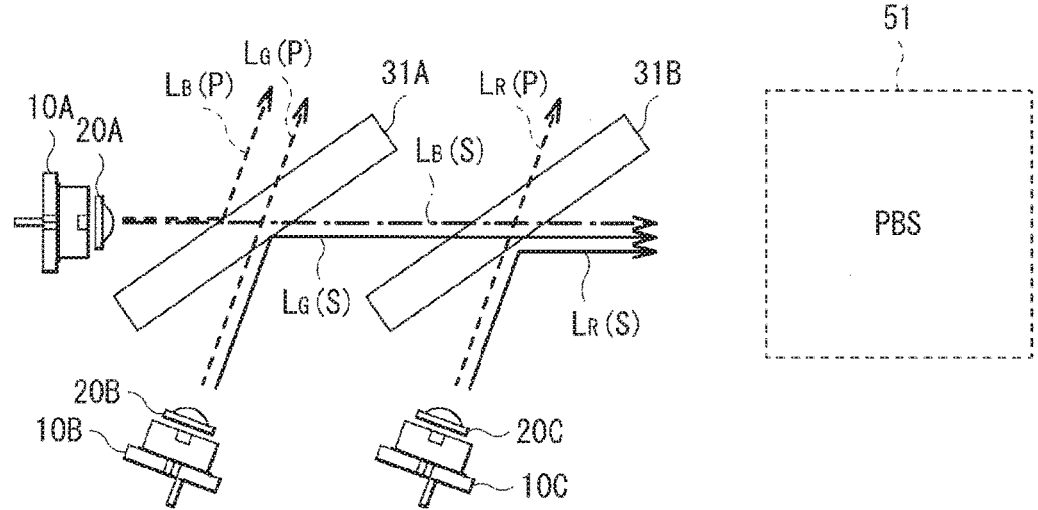
[ FIG. 21 ]
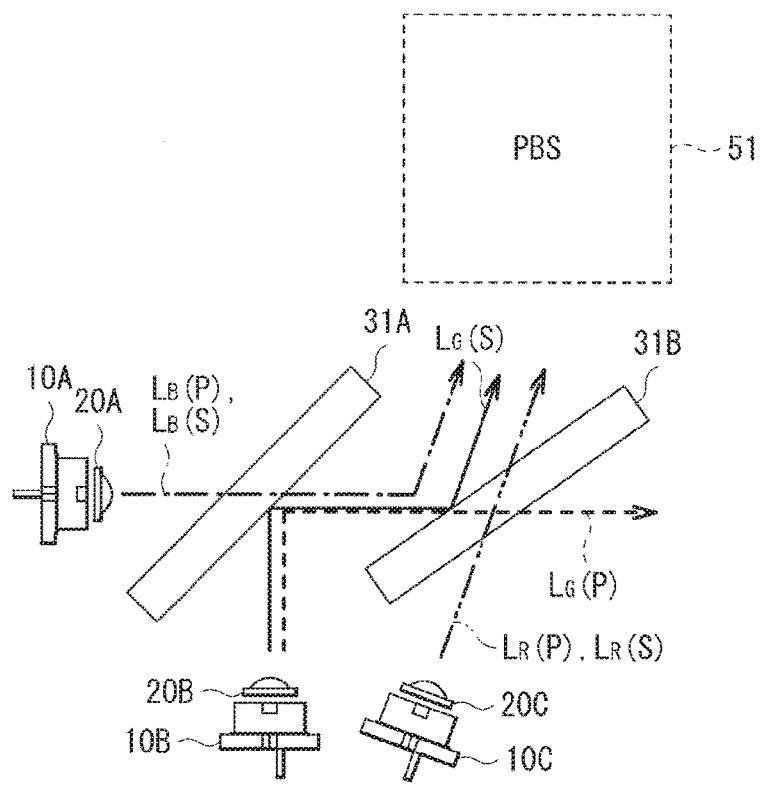

[ FIG. 22 ]
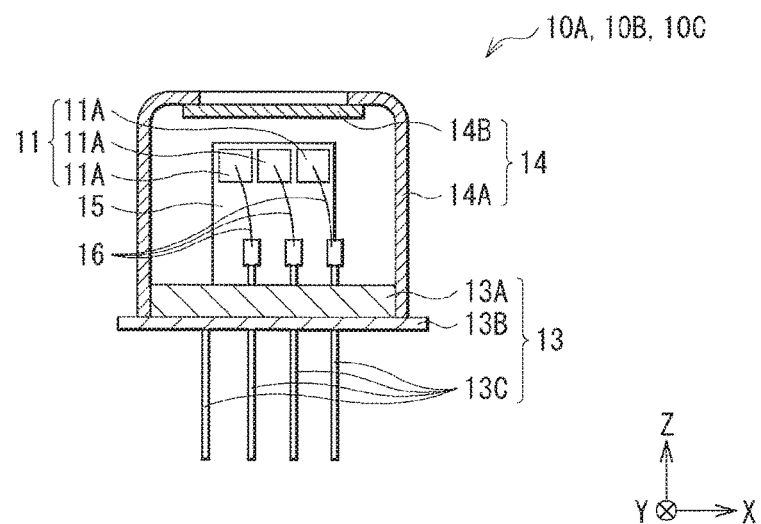
[ FIG. 23 ]
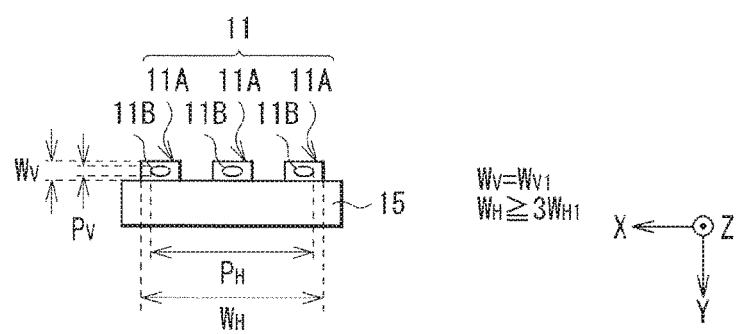

[ FIG. 24 ]
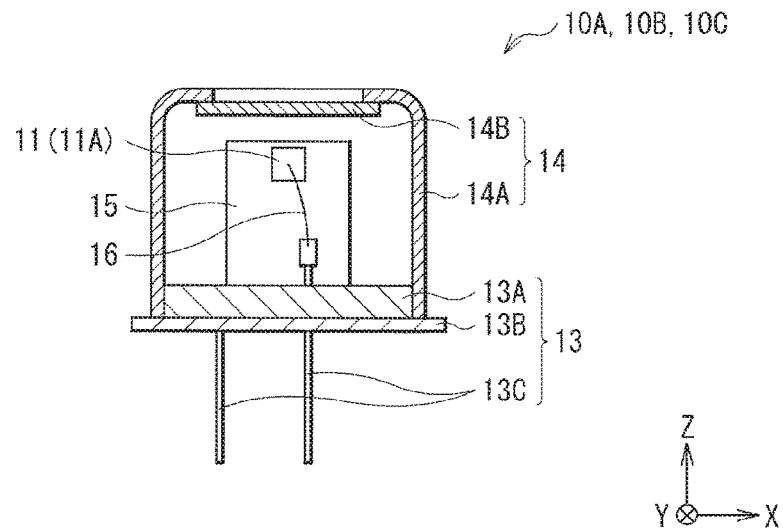
[ FIG. 25 ]
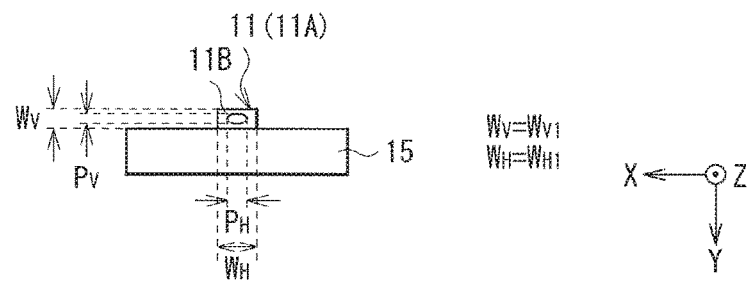
[ FIG. 26 ]
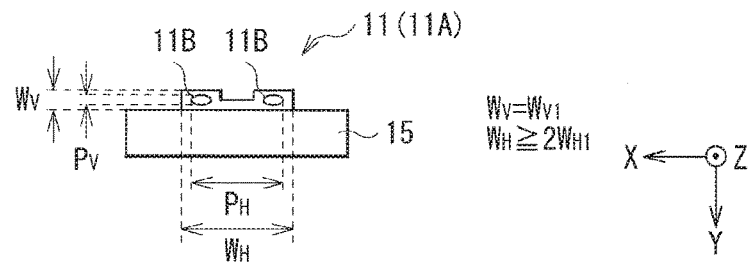

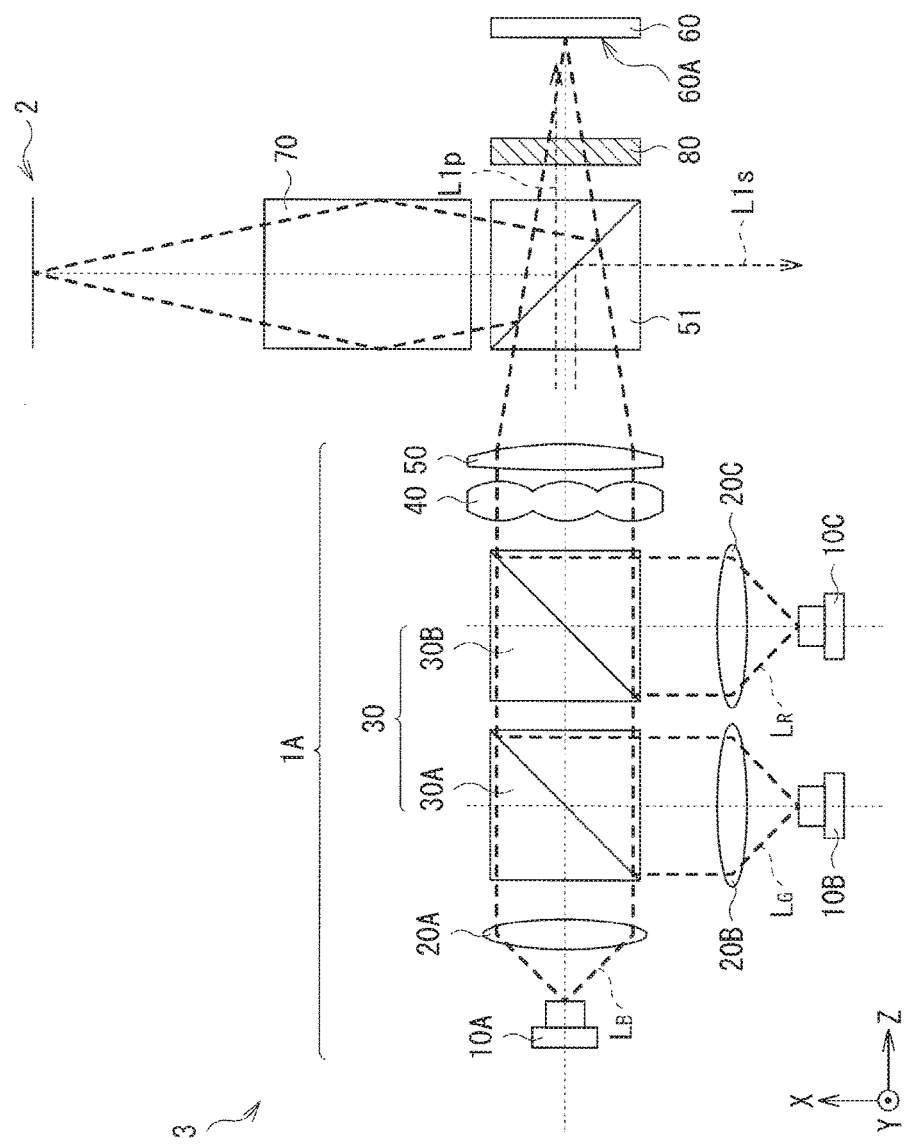
[FIG. 27]

[ FIG. 28 ]
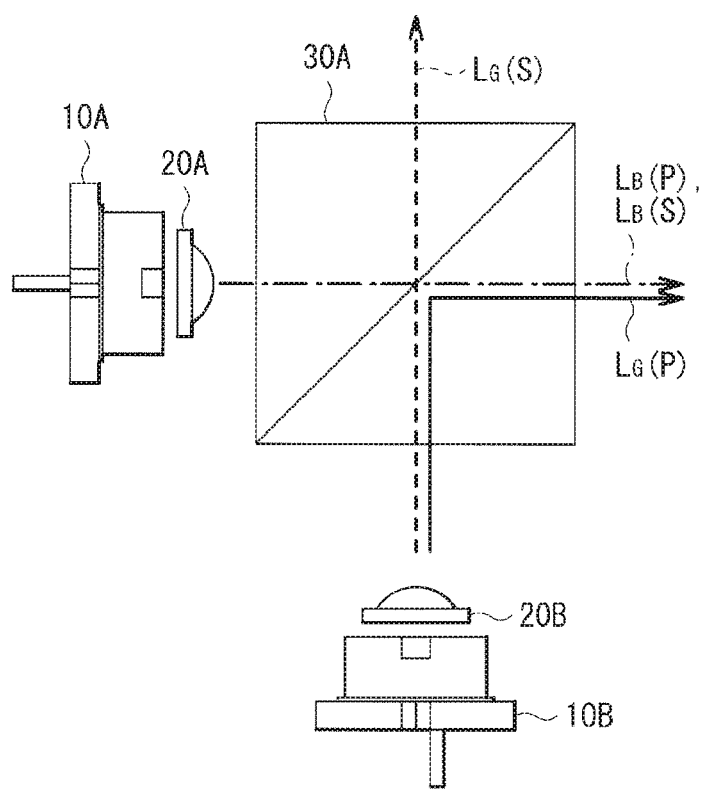

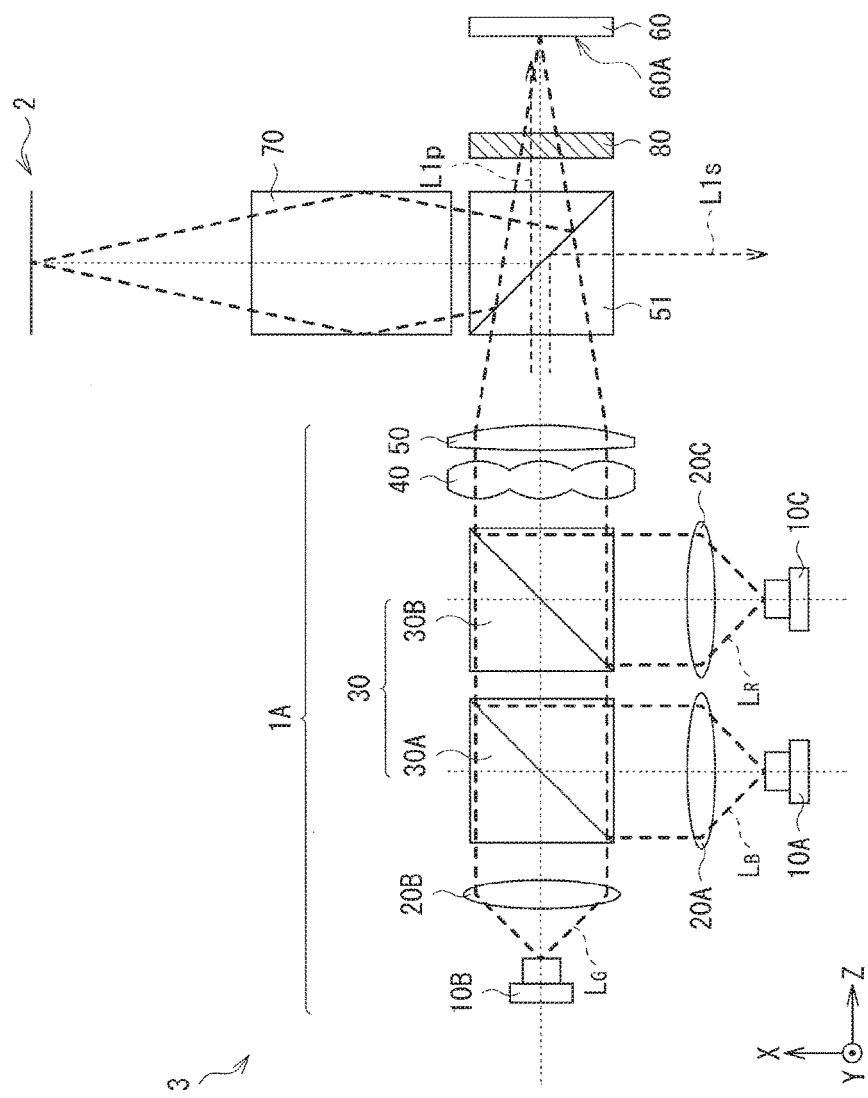
[FIG. 29]

[ FIG. 30 ]
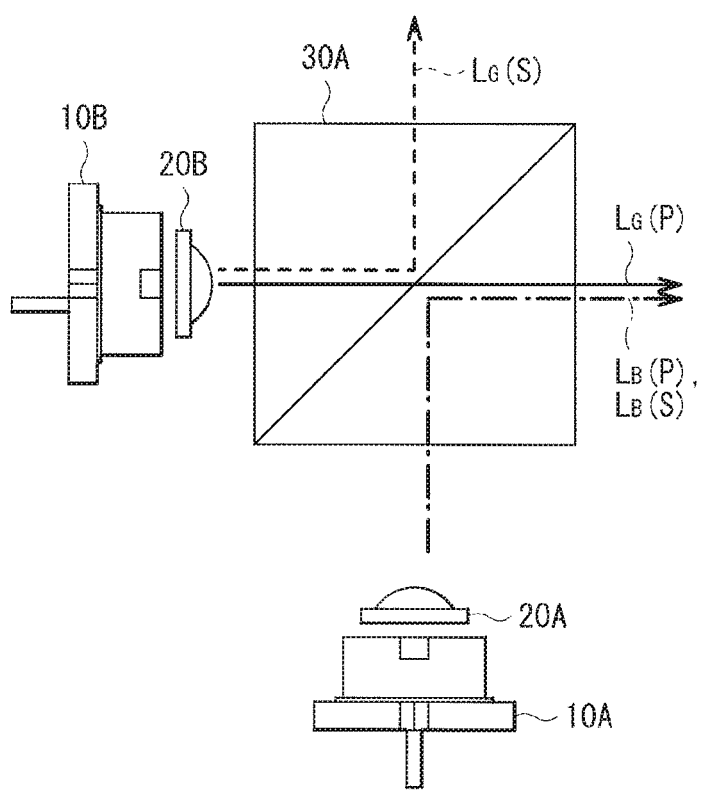

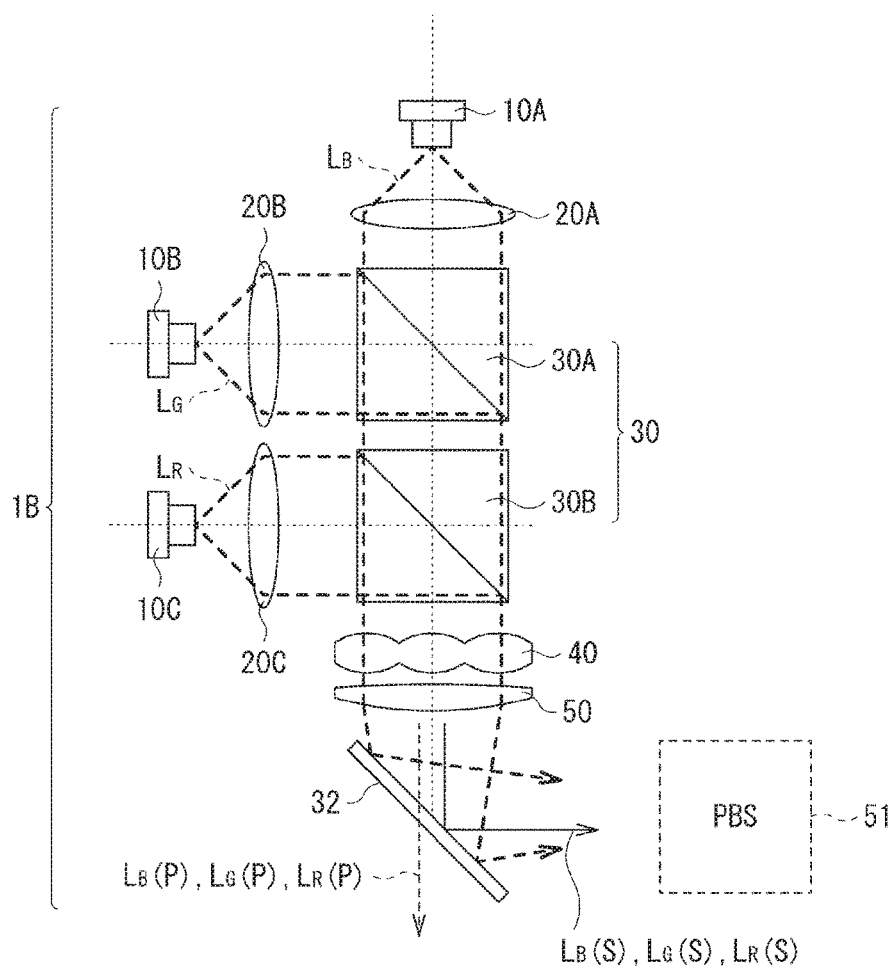
[ FIG. 31 ]

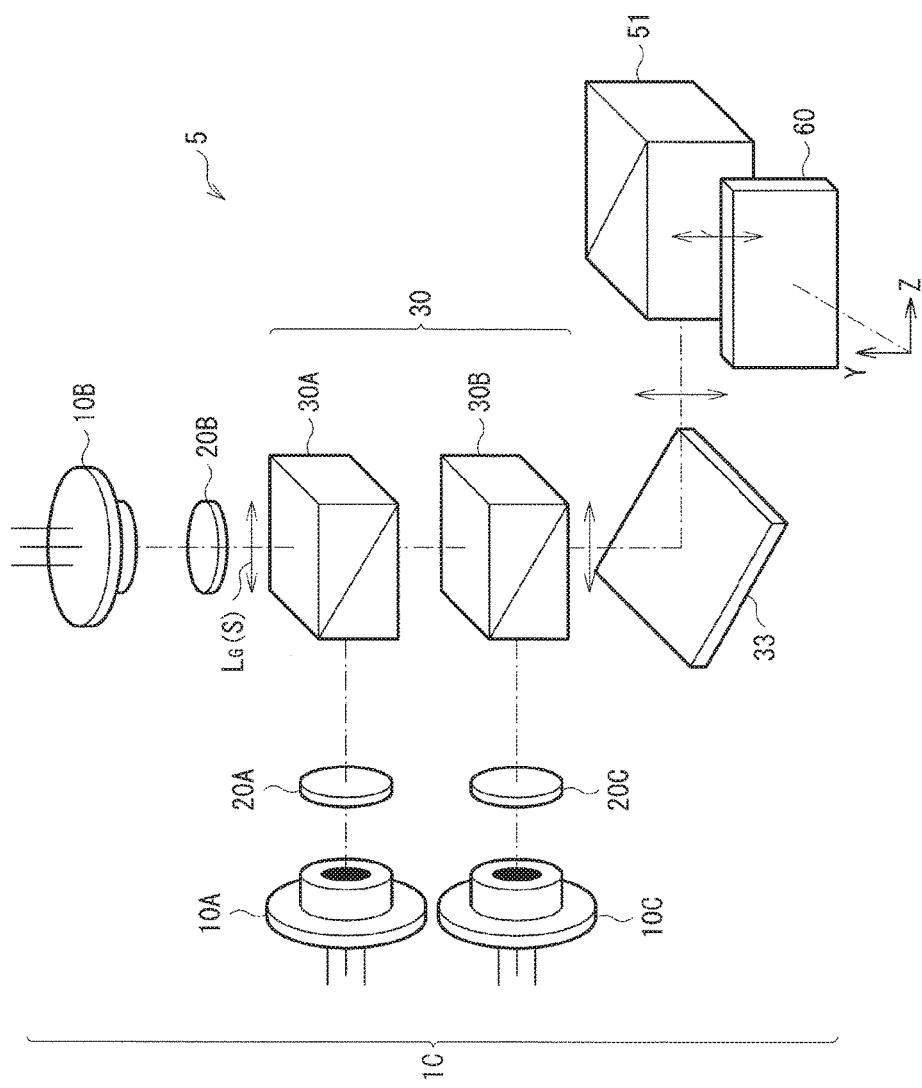
[FIG. 32]

[ FIG. 33 ]
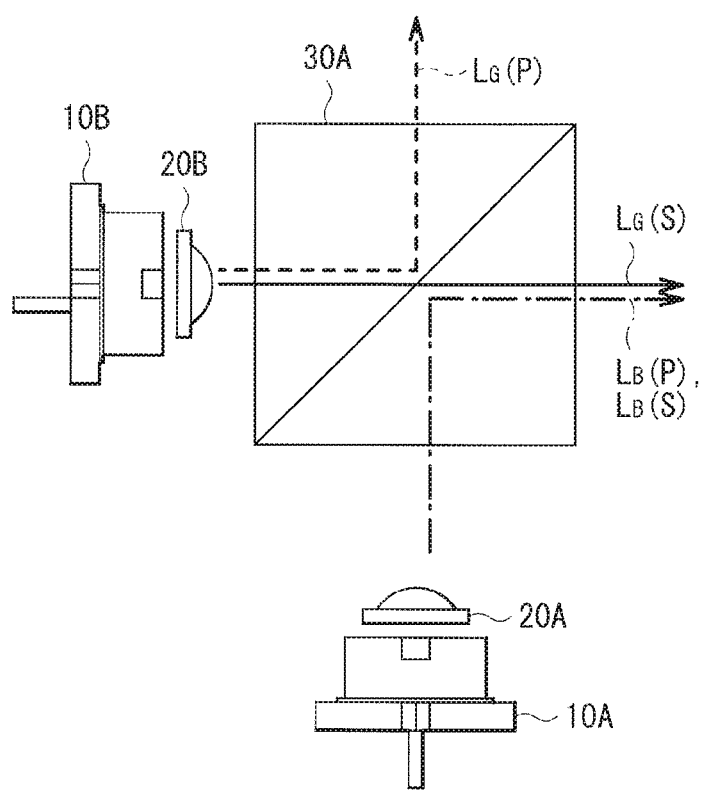

ILLUMINATING UNIT AND PROJECTION DISPLAY APPARATUS

CROSS REFERENCE TO RELATED APPLICATIONS

This application is a U.S. National Phase of International Patent Application No. PCT/JP2015/072866 filed on Aug. 12, 2015, which claims priority benefit of Japanese Patent Application No. JP 2014-189019 filed in the Japan Patent Office on Sep. 17, 2014. Each of the above-referenced applications is hereby incorporated herein by reference in its entirety.

TECHNICAL FIELD

The disclosure relates to an illuminating unit, and to a projection display apparatus that projects images with use of light from the illuminating unit.

BACKGROUND ART

In recent years, a projector (projection display apparatus) that projects images on a screen has been widely used in not only offices but also homes. The projector carries out display operation in such a manner that image light is generated by modulating light from a light source with use of a light valve (spatial modulation device) to project the resultant image light on a screen (for example, see PTLs 1 and 2). Recently, a palm-sixed ultracompact projector, a mobile phone with a built-in ultracompact projector, or any other similar apparatus has begun to become widespread.

CITATION LIST

Patent Literature

PTL 1 Japanese Unexamined Patent Application Publication No. 2011-128634
PTL 2 Japanese Unexamined Patent Application Publication No. 2010-48903
PTL 3 Japanese Unexamined Patent Application Publication No. 2003-44839

SUMMARY OF THE INVENTION

In the projector as described above, it is generally desired to enhance contrast for improving the display image quality. Specifically, for example, when a reflective liquid crystal device is used as the spatial modulation device, to enhance the contrast, it is desired to reduce luminance at the time of black display by suppressing leakage light from an optical system during the black display.

In a liquid crystal projector, a method of improving the contrast is generally used that raises a polarization ratio of light incoming/outgoing into/from a liquid crystal device by inserting a polarizing element (for example, an iodine polarizing plate, a wire-grid polarizing plate, or any other similar element) before or after the liquid crystal device acting as the spatial modulation device. In this case, the number of components may increase, leading to an increase in cost. Further, the polarizing element may not achieve the necessary transmittance of 100% for the light in a polarization direction, which may cause the light utilization efficiency to be reduced, resulting in deterioration in the brightness.

Accordingly, it is desirable to provide an illuminating unit and a projection display apparatus that make it possible to improve the contrast.

An illuminating unit according to an embodiment of the disclosure includes: a light source; a plurality of optical members for illumination that guide light from the light source to a predetermined optical path; and a polarization split element that transfers, to a predetermined illuminating position, a first polarized component included in the light guided to the predetermined optical path. One or more of the plurality of optical members for illumination have optical properties, for the light at a predetermined wavelength band outputted from the light source, of guiding the first polarized component to the predetermined optical path, and guiding a second polarized component that is different from the first polarized component toward a direction deviated from the predetermined optical path.

A projection display apparatus according to an embodiment of the disclosure includes: a light source; a plurality of optical members for illumination that guide light from the light source to a predetermined optical path; a polarization split element that transfers, to a predetermined illuminating position, a first polarized component included in the light guided to the predetermined optical path; a light valve that is disposed at the predetermined illuminating position and modulates light on the basis of image data; and a projection lens that projects, on a projection surface, the modulated light from the light valve. One or more of the plurality of optical members for illumination have optical properties of, for light at a predetermined wavelength band outputted from the light source, guiding the first polarized component to the predetermined optical path, and guiding a second polarized component that is different from the first polarized component toward a direction deviated from the predetermined optical path.

In the illuminating unit and the projection display apparatus according to the respective embodiments of the disclosure, one or more of the plurality of optical members for illumination guide the first polarized component to the predetermined optical path and guide the second polarized component that is different from the first polarized component toward the direction deviated from the predetermined optical path, for the light at the predetermined wavelength band outputted from the light source.

According to the illuminating unit and the projection display apparatus of the respective embodiments of the disclosure, an undesired polarized component is guided toward the direction deviated from the predetermined optical path with use of the optical members for illumination, which makes it possible to improve the contrast.

It is to be noted that effects described herein are not necessarily limited, and may be any of effects that will be described in the disclosure.

BRIEF DESCRIPTION OF DRAWINGS

FIG. 1 is a configuration diagram illustrating an example of an overall configuration of a projection display apparatus according to a first embodiment of the disclosure.

FIG. 2 is an explanatory diagram illustrating an example of an optical path at the time of white display of the projection display apparatus according to the first embodiment.

FIG. 3 is an explanatory diagram illustrating an example of an optical path at the time of black display of the projection display apparatus according to the first embodiment.

FIG. 4 is an explanatory diagram illustrating an example of a configuration and workings of a single optical member for illumination in the projection display apparatus according to the first embodiment.

FIG. 5 is a cross-sectional view illustrating a configuration example of a light source.

FIG. 6 is a configuration diagram illustrating the light source illustrated in FIG. 5 as viewed from the light-output-surface side.

FIG. 7 is a cross-sectional view illustrating another configuration example of the light source.

FIG. 8 is a configuration diagram illustrating the light source illustrated in FIG. 6 as viewed from the light-output-surface side.

FIG. 9 is a configuration diagram illustrating another configuration example of the light source illustrated in FIG. 6.

FIG. 10 is an explanatory diagram illustrating workings of a polarization compensation element for an S-polarized component.

FIG. 11 is an explanatory diagram illustrating an example of a far-field pattern of a light source.

FIG. 12 is an explanatory diagram illustrating workings of a polarization compensation element for a P-polarized component.

FIG. 13 is an explanatory diagram illustrating a state of light in a case where the S-polarized component and the P-polarized component are mixed, and a polarization ratio is deteriorated.

FIG. 14 is an explanatory diagram illustrating a configuration and workings of a single optical member for illumination in a projection display apparatus according to a first modification example.

FIG. 15 is an explanatory diagram illustrating an example of an incoming angle of light at a predetermined wavelength band with respect to the optical member for illumination in the first modification example.

FIG. 16 is an explanatory diagram illustrating another example of the incoming angle of the light at the predetermined wavelength band with respect to the optical member for illumination in the first modification example.

FIG. 17 is an explanatory diagram illustrating an example of the polarizing properties of the optical member for illumination depending on the incoming angle.

FIG. 18 is an explanatory diagram illustrating a configuration and workings of two optical members for illumination in a projection display apparatus according to a second modification example.

FIG. 19 is an explanatory diagram illustrating a configuration and workings of two optical members for illumination in a projection display apparatus according to a third modification example.

FIG. 20 is an explanatory diagram illustrating a configuration and workings of two optical members for illumination in a projection display apparatus according to a fourth modification example.

FIG. 21 is an explanatory diagram illustrating a configuration and workings of two optical members for illumination in a projection display apparatus according to a fifth modification example.

FIG. 22 is a cross-sectional view illustrating a configuration example of a light source according to a sixth modification example.

FIG. 23 is a configuration diagram illustrating the light source illustrated in FIG. 22 as viewed from the light-output-surface side.

FIG. 24 is a cross-sectional view illustrating another configuration example of the light source according to the sixth modification example.

FIG. 25 is a configuration diagram illustrating the light source illustrated in FIG. 24 as viewed from the light-output-surface side.

FIG. 26 is a configuration diagram illustrating another configuration example of the light source illustrated in FIG. 24.

FIG. 27 is a configuration diagram illustrating a configuration example of a projection display apparatus according to a second embodiment.

FIG. 28 is an explanatory diagram illustrating a configuration and workings of a single optical member for illumination in the projection display apparatus according to the second embodiment.

FIG. 29 is a configuration diagram illustrating a configuration example of a projection display apparatus according to a third embodiment.

FIG. 30 is an explanatory diagram illustrating a configuration and workings of a single optical member for illumination in the projection display apparatus according to the third embodiment.

FIG. 31 is a configuration diagram illustrating a configuration example of an illuminating optical system in a projection display apparatus according to a fourth embodiment.

FIG. 32 is a configuration diagram illustrating an example of an overall configuration of a projection display apparatus according to a fifth embodiment.

FIG. 33 is an explanatory diagram illustrating a configuration and workings of a single optical member for illumination in the projection display apparatus according to the fifth embodiment.

DESCRIPTION OF EMBODIMENTS

Hereinafter, some embodiments of the disclosure are described in detail with reference to the drawings. It is to be noted that the description is given in the following order.
1. First Embodiment (a projection display apparatus that makes light reflected by a polarization split element enter a light valve) (FIGS. 1 to 26)
  1.1 Configuration
    1.1.1 Overall Configuration Example of Projection Display Apparatus
    1.1.2 Configuration Examples of Light Sources
    1.1.3 Configuration Examples of Display Optical System
  1.2 Operation and Workings
    1.2.1 Basic Operation
    1.2.2 Workings of Polarization Compensation Element
    1.2.3 Description of Optical Member for Illumination for Improving Polarization Ratio
  1.3 Effects
  1.4 Modification Examples of First Embodiment
    1.4.1 First Modification Example (FIGS. 14 to 17)
    1.4.2 Second Modification Example (FIG. 18)
    1.4.3 Third Modification Example (FIG. 19)
    1.4.4 Fourth Modification Example (FIG. 20)
    1.4.5 Fifth Modification Example (FIG. 21)
    1.4.6 Sixth Modification Example (FIGS. 22 to 26)
2. Second Embodiment (a projection display apparatus that makes light passing through a polarization split element enter a light valve) (FIGS. 27 and 28)
3. Third Embodiment (a projection display apparatus that makes light passing through a polarization split element enter a light valve) (FIGS. 29 and 30)

4. Fourth Embodiment (a projection display apparatus provided with a polarizing mirror (FIG. 31)
5. Fifth Embodiment (a projection display apparatus in which an optical path from a light source to a light valve is not present in the same plane) (FIGS. 32 and 33)
6. Other Embodiments

1. First Embodiment

1.1 Configuration

1.1.1 Overall Configuration Example of Projection Display Apparatus

FIG. 1 illustrates a simplified configuration of a projector 1 that serves as a projection display apparatus according to a first embodiment of the disclosure, along with optical paths (thick dashed lines) and optical axes (thin dashed lines). The projector 1 may carry out image display by projecting image light that is generated on the basis of an inputted image signal on a reflective screen 2.

It is to be noted that typically a Y-axis is oriented in a vertical direction, and an X-axis is oriented in a horizontal direction in FIG. 1. To the contrary, however, the Y-axis may be oriented in the horizontal direction, and the X-axis may be oriented in the vertical direction. Hereinafter, for descriptive purposes, the description is provided on an assumption that the Y-axis is oriented in the vertical direction, and the X-axis is oriented in the horizontal direction. Further, in the following, a "lateral direction" refers to the X-axis direction, and a "longitudinal direction" refers to the Y-axis direction.

The projector 1 may include, for example, an illuminating optical system 1A and a display optical system. The display optical system may have a light valve 60, a polarization beam splitter 51, a polarization compensation element 80, and a projection optical system 70.

The illuminating optical system 1A may supply light flux with which an illumination range 60A (a surface being irradiated) of the light valve 60 is irradiated. It is to be noted that any optical element may be provided as appropriate on a region of the illuminating optical system 1A that light may pass through. For example, a filter or any other optical element that reduces any light other than visible light in the light from the illuminating optical system 1A may be provided on the region of the illuminating optical system 1A that the light may pass through.

For example, as illustrated in FIG. 1, the illuminating optical system 1A may have a plurality of light sources (a first light source 10A, a second light source 10B, and a third light source 10C), and a plurality of optical members for illumination that guide light from each of the plurality of light sources to a predetermined optical path (an optical path leading to the polarization beam splitter 51 and the light valve 60). As the plurality of optical members for illumination, the illuminating optical system 1A may have coupling lenses (directivity angle conversion elements) 20A, 20B, and 20C, an optical path combination element 30, an integrator (a fly-eye lens) 40, and a condenser lens 50.

Each of the first light source 10A, the second light source 10B, and the third light source 10C may emit light with a different wavelength band from one another, and may be disposed on a different optical path from one another.

The optical path combination element 30 may combine the light from each of the first light source 10A, the second light source 10B, and the third light source 10C, and may include a first optical path combination element 30A and a second optical path combination element 30B. In the present embodiment, as described hereinafter, the first optical path combination element 30A that is one of the optical members for illumination may have the optical property that, in combining optical paths, for light at a predetermined wavelength band (for example, green light $L_G$), guides a first polarized component (for example, S-polarized component) to a predetermined optical path, and guides a second polarized component (for example, P-polarized component) toward a direction deviated from the predetermined optical path, as illustrated in FIG. 4.

The integrator 40 may uniform the illumination distribution (luminance distribution) of light in the illumination range 60A, and may include a single fly-eye lens here. However, the integrator 40 may include a pair of fly-eye lenses alternatively.

On an optical axis of the first light source 10A, the coupling lens 20A, the optical path combination element 30, the integrator 40, and the condenser lens 50 may be disposed in this order from the first light source 10A side. An optical axis of the second light source 10B may be orthogonal to the optical axis of the first light source 10A in the first optical path combination element 30A. On the optical axis of the second light source 10B, the coupling lens 20B and the first optical path combination element 30A may be disposed in this order from the second light source 10B side. An optical axis of the third light source 10C may be orthogonal to the optical axis of the first light source 10A in the second optical path combination element 30B. On the optical axis of the third light source 10C, the coupling lens 20C and the second optical path combination element 30B may be disposed in this order from the third light source 10C side.

For example, as illustrated in FIG. 1, the coupling lens 20A may put the light that is emitted from the first light source 10A into substantially parallelized light, and may convert a directivity angle of the light that is emitted from the first light source 10A to be equal to a directivity angle of parallel light, or to be close to such a directivity angle. The coupling lens 20A may be disposed at a position which the light within the range of the directivity angle in the light that is emitted from the first light source 10A may enter. For example, as illustrated in FIG. 1, the coupling lens 20B may put the light that is emitted from the second light source 10B into substantially parallelized light, and may convert a directivity angle of the light that is emitted from the second light source 10B to be equal to a directivity angle of parallel light, or to be close to such a directivity angle. The coupling lens 20B may be disposed at a position which the light within the range of the directivity angle in the light that is emitted from the second light source 10B may enter. For example, as illustrated in FIG. 1, the coupling lens 20C may put the light that is emitted from the third light source 10C into substantially parallelized light, and may convert a directivity angle of the light that is emitted from the third light source 10C to be equal to a directivity angle of parallel light, or to be close to such a directivity angle. The coupling lens 20C may be disposed at a position which the light within the range of the directivity angle in the light that is emitted from the third light source 10C may enter. In other words, the coupling lenses 20A, 20B, and 20C may be disposed one-by-one for each of the light sources 10A, 10B, and 10C (for each package), respectively. It is to be noted that each of the coupling lenses 20A, 20B, and 20C may be configured of a single lens or a plurality of lenses.

Each of the first optical path combination element 30A and the second optical path combination element 30B may include a single piece of mirror having the wavelength selectivity. It is to be noted that the above-described mirror may be configured with use of, for example, vapor deposition of a multi-layer interference film. For example, as illustrated in FIG. 1, the first optical path combination element 30A may transmit the light entering from the rear surface side of the mirror (the light entering from the first light source 10A side) toward the front surface side of the mirror, while reflecting a portion of the light entering from the front surface side of the mirror (the light entering from the second light source 10B side) with use of the mirror. Meanwhile, as illustrated in FIG. 1, the second optical path combination element 30B may transmit the light entering from the rear surface side of the mirror (the light from the light sources 10A and 10B that enters from the first optical path combination element 30A side) toward the front surface side of the mirror, while reflecting the light entering from the front surface side of the mirror (the light entering from the third light source 10C side) with use of the mirror. Therefore, the optical path combination element 30 may combine individual light fluxes that are emitted from the light sources 10A, 10B, and 10C in a single light flux.

The integrator (fly-eye lens) 40 may include a plurality of lenses that may be disposed, for example, in a predetermined array state (for example, in a matrix pattern). Generally, the light flux that is emitted from each of the light sources 10A, 10B, and 10C may have non-uniform intensity distribution (luminance distribution) in a plane perpendicular to a traveling direction thereof. Therefore, if these light fluxes are guided to the illumination range 60A (the surface being irradiated) as they are, the illumination distribution (luminance distribution) in the illumination range 60A may become non-uniform. On the contrary, if the light flux that is emitted from each of the light sources 10A, 10B, and 10C is divided into a plurality of light fluxes by the integrator 40, and each of such divided light fluxes is guided to the illumination range 60A in a superimposed manner, it is possible to uniform the illumination distribution in the illumination range 60A (to reduce the non-uniformity of the illumination distribution).

The condenser lens 50 may collect light fluxes from the multiple light sources that are formed by the integrator 40 to illuminate the illumination range 60A in a superimposed manner.

1.1.2 Configuration Examples of Light Sources

The first light source 10A may be a laser light source that emits blue light $L_B$ at a wavelength of, for example, about 450 nm. A green laser 11G may be a laser light source that emits green light $L_G$ at a wavelength of, for example, about 520 nm. The red laser 11R may be a laser light source that emits red light $L_R$ at a wavelength of, for example, about 640 nm.

For example, as illustrated in FIG. 5 and FIG. 6, each of the first light source 10A, the second light source 10B, and the third light source 10C may include a configuration that has a plurality of chips 11A. For example, three chips 11A each of which emits any of the red light $L_R$, the green light $L_G$, and the blue light $L_B$ may be provided. Alternatively, for example, as illustrated in FIGS. 7 to 9, each of the first light source 10A, the second light source 10B, and the third light source 10C may include a configuration that has the single chip 11A.

Each of the configuration examples illustrated in FIG. 5 and FIG. 6, or FIGS. 7 to 9 may take a form of a can type where a solid-state light-emitting device 11 that includes the single or the plurality of edge-emitting chip(s) 11A is housed in an internal space surrounded by a stem 13 and a cap 14.

It is to be noted that FIG. 6 illustrates the light source illustrated in FIG. 5 as viewed from the light-output-surface side. FIG. 8 illustrates the light source illustrated in FIG. 7 as viewed from the light-output-surface side. FIG. 9 illustrates another configuration example of the light source illustrated in FIG. 7.

The chip 11A may include, for example, a light-emitting diode (LED), an organic EL light-emitting device (OLED), or a laser diode (LD). The chip 11A that is included in each of the light sources 10A, 10B, and 10C may emit the light at a different wavelength band from one another for each of the light sources 10A, 10B, and 10C, for example. The chip 11A that is included in the first light source 10A may emit the light (blue light $L_B$) at a wavelength within the range of, for example, about 400 nm to about 500 nm (for example, about 450 nm). The chip 11A that is included in the second light source 10B may emit the light (green light $L_G$) at a wavelength within the range of, for example, about 500 nm to about 600 nm (for example, about 520 nm). The chip 11A that is included in the third light source 10C may emit the light (red light $L_R$) at a wavelength within the range of, for example, about 600 nm to about 700 nm (for example, about 640 nm).

The stem 13 may configure a package of the light source together with the cap 14, and may have, for example, a support substrate 13A that supports a sub-mount 15, an outer-frame substrate 13B that is disposed on the backside of the support substrate 13A, and a plurality of connection terminals 13C.

The sub-mount 15 may be made of a material having the electrical conductivity and radiation performance. Each of the support substrate 13A and the outer-frame substrate 13B may be configured in such a manner that a single or a plurality of insulating through-holes and a single or a plurality of conductive through-holes are formed on a base material having the electrical conductivity and radiation performance. Each of the support substrate 13A and the outer-frame substrate 13B may be, for example, in the shape of a circular disc, and both central axes (not illustrated) may be stacked to overlap with each other. A diameter of the outer-frame substrate 13B may be greater than a diameter of the support substrate 13A. An outer edge of the outer-frame substrate 13B may serve as a ring-like flange that protrudes from the central axis of the outer-frame substrate 13B toward a radiation direction in a plane using the central axis of the outer-frame substrate 13B as a normal line. The flange may have a role of defining a reference position in fitting the cap 14 to the support substrate 13A in a manufacturing process.

The plurality of connection terminals 13C may run through at least the support substrate 13A. Terminals excluding one or more terminals among the plurality of connection terminals 13C (hereinafter referred to as "terminals α" for descriptive purposes) may be electrically coupled one-by-one to electrodes (not illustrated) of the individual chips 11A. For example, the terminals α may protrude long toward the outer-frame substrate 13B side, and may protrude short toward the support substrate 13A side. Further, terminals other than the above-described terminals α among the plurality of connection terminals 13C (hereinafter referred to as "terminals β" for descriptive purposes) may be electrically coupled to any other electrodes (not illustrated) of all the chips 11A. For example, the terminals β may protrude long toward the outer-frame substrate 13B side, and an end edge of the terminals β on the support substrate 13A side may be embedded into the support substrate 13A. A portion protruding long toward the outer-frame substrate 13B side among the respective connection terminals 13C may correspond to a portion embedded into a substrate or any other base material, for example. In turn, a portion protruding short toward the support substrate 13A side among the plurality of connection terminals 13C may correspond to a portion that may be electrically coupled one-by-one to the individual chips 11A through a wire 16. A portion embedded into the support substrate 13A among the plurality of connection terminals 13C may correspond to a portion that may be electrically coupled to all the chips 11A through the support substrate 13A and the sub-mount 15, for example. The terminals α may be supported by the insulating through-holes that are provided on the support substrate 13A and the outer-frame substrate 13B, and may be insulated and isolated from the support substrate 13A and the outer-frame substrate 13B by those through-holes. Further, the individual terminals α may be insulated and isolated from one another by the above-described insulating member. On the other hand, the terminals β may be supported by the conductive through-holes that are provided on the support substrate 13A and the outer-frame substrate 13B, and may be electrically coupled to those through-holes.

The cap 14 may seal the solid-state light-emitting device 11. The cap 14 may have, for example, a cylindrical section 14A with apertures provided at an upper end and a lower end thereof. For example, the lower end of the cylindrical section 14A may be in contact with a side surface of the support substrate 13A, and the solid-state light-emitting device 11 may be located at an internal space of the cylindrical section 14A. The cap 14 may have a light transmissive window 14B that is disposed to block the aperture on the upper end side of the cylindrical section 14A. The light transmissive window 14B may be disposed at a position facing a light output surface of the solid-state light-emitting device 11, and may have a function of transmitting the light that is outputted from the solid-state light-emitting device 11.

As described above, in a case where the chip 11A is configured of an edge-emitting device, the solid-state light-emitting device 11 may emit light from a light output region that includes a single or a plurality of dot-like light-emitting spots, or a single or a plurality of non-dot-like light-emitting spots. The solid-state light-emitting device 11 may include, for example, the single chip 11A that emits light at a predetermined wavelength band, or the plurality of chips 11A each of which emits light at the same wavelength band. When the solid-state light-emitting device 11 includes the plurality of chips 11A, these chips 11A may be disposed on a line in a longitudinal direction (Y direction and V direction), as illustrated in FIG. 5 and FIG. 6, for example.

When the solid-state light-emitting device 11 includes the single chip 11A, a size ($W_V \times W_H$) of the solid-state light-emitting device 11 may be equal to a size ($W_{V1} \times W_{H1}$) of the single chip 11A, as illustrated in FIG. 8, for example. However, as illustrated in an example in FIG. 9, when the solid-state light-emitting device 11 adopts a monolithic structure, the size is as follows. That is, in an example in FIG. 9, the size ($W_V \times W_H$) of the solid-state light-emitting device 11 may be equal to or greater than $2W_{V1} \times W_{H1}$. On the other hand, if the solid-state light-emitting device 11 includes the plurality of chips 11A, the size of the solid-state light-emitting device 11 may be equal to a size measured when all of the chips 11A are lumped together, as illustrated in FIG. 6, for example. When the plurality of chips 11A are disposed on a line in a longitudinal direction, the size ($W_V \times W_H$) of the solid-state light-emitting device 11 may be equal to or greater than $3W_{V1} \times W_H$) in an example in FIG. 6.

1.1.3 Configuration Examples of Display Optical System

The polarization beam splitter 51 may be a polarization split element that transfers a predetermined polarized component (for example, S-polarized light) included in the light to be guided to a predetermined optical path to a predetermined illuminating position (the light valve 60). The polarization beam splitter 51 may be configured in such a manner that prisms each of which is coated with a multi-layer film are bonded to each other, for example. Alternatively, examples of the polarization split element may include an element having the polarizing property (a wire grid or a polarizing film), or a beam splitter similar to prisms that sandwich such an element in between.

The polarization beam splitter 51 may be disposed on an optical path between the illuminating optical system 1A (the condenser lens 50) and the light valve 60. The polarization beam splitter 51 may be an optical member that selectively transmits the specific polarized light (for example, the P-polarized light), while selectively reflecting the other polarized light (for example, the S-polarized light). This may ensure that the light (for example, the S-polarized light) entering from the illuminating optical system 1A side is reflected selectively in the polarization beam splitter 51 to enter the light valve 60.

[Light Valve 60]

The light valve 60 may be a spatial modulation device that may include, for example, a reflective liquid crystal device. The light valve 60 may two-dimensionally modulate a light flux from the illuminating optical system 1A on the basis of a color image signal (an inputted image signal) corresponding to each wavelength component of the light sources 10, 10B, and 10C, thereby generating image light. The light valve 60 may include, for example, a liquid crystal panel with use of TN (Twisted Nematic) liquid crystal (liquid crystal molecules having the positive refractive-index anisotropy). Specifically, the light valve 60 may have a structure where a liquid crystal layer (not illustrated) with use of the TN-mode liquid crystal is interposed between a pair of substrates (not illustrated) to which a drive voltage based on an image signal is applied for each of a plurality of pixels (not illustrated) that are disposed in a matrix pattern.

In a case where the above-described TN-type liquid crystal is used, the light valve 60 may perform light modulation in the following manner when the drive voltage is not applied and when the drive voltage is applied, respectively.

First, when the drive voltage is not applied (at the time of white display to be hereinafter described), the light valve 60 may have the property of outputting light in such a manner that a phase difference in an entrance plane is given to entered light (image light) by aligning the liquid crystal molecules in a twisted manner, and a polarizing axis is rotated by about 90 degrees. In other words, when no drive voltage is applied, the light valve 60 may perform the light modulation while reflecting polarized light (for example, the S-polarized light or the P-polarized light) in such a manner that the polarized light at the time of entrance and the polarized light at the time of output may be different from each other.

On the contrary, when the drive voltage is applied (at the time of black display to be hereinafter described), the light valve 60 may have the property of outputting light in such a manner that no phase difference in the entrance plane is given to entered light (image light) by aligning the liquid crystal molecules in a body in a thickness direction of the light valve 60, and the polarizing axis is held. In other words, when the drive voltage is applied, the light valve 60 may perform the light modulation while reflecting polarized light (for example, the S-polarized light or the P-polarized light) in such a manner that the polarized light at the time of entrance and the polarized light at the time of output may be (held to be) identical to each other.

In such a manner, the polarized light of the image light that is outputted from the light valve 60 may be different from each other at the time when no drive voltage is applied and at the time when the drive voltage is applied. By combining such the polarization property in the light valve 60 with the optical property of the above-described polarization beam splitter 51, the white display or the black display is achieved in the projector 1, as described later.

Alternatively, the light valve 60 may include a liquid crystal panel with use of, for example, VA (Vertical Alignment) liquid crystal (liquid crystal molecules having the negative refractive-index anisotropy) instead of the above-described TN-type liquid crystal. In this case, the light valve 60 may have a structure in which a liquid crystal layer (not illustrated) with use of the VA-mode liquid crystal is interposed between the above-described pair of substrates (not illustrated).

In a case where the above-described VA-type liquid crystal is used, the light valve 60 may perform the light modulation in the following manner when the drive voltage is not applied and when the drive voltage is applied, respectively.

First, when the drive voltage is not applied (at the time of the black display to be hereinafter described), the liquid crystal molecules may be aligned almost vertically (in the thickness direction of the light valve 60). Therefore, the light valve 60 may have the property of outputting light in such a manner that no phase difference in the entrance plane is given to the entered light (image light), and the polarizing axis is held. In other words, when no drive voltage is applied, the light valve 60 may perform the light modulation while reflecting polarized light in such a manner that the polarized light at the time of entrance and the polarized light at the time of output may be (held to be) identical to each other, in contrast with a case of the above-described TN-type liquid crystal.

On the contrary, when the drive voltage is applied (at the time of the white display to be hereinafter described), the liquid crystal molecules may be aligned in a fallen state to become almost horizontal. Therefore, the light valve 60 may have the property of outputting light in such a manner that a phase difference in the entrance plane is given to the entered light (image light), and the polarizing axis is rotated by about 90 degrees. In other words, also when the drive voltage is applied, the light valve 60 may perform the light modulation while reflecting polarized light in such a manner that the polarized light at the time of entrance and the polarized light at the time of output may be different from each other, in contrast with a case of the above-described TN-type liquid crystal.

As described above, also when the VA-type liquid crystal is used, the polarized light of the image light that is outputted from the light valve 60 may be different from each other at the time when no drive voltage is applied and at the time when the drive voltage is applied, as with the case where the TN-type liquid crystal is used. Therefore, in this case as well, by combining the polarization property in the light valve 60 with the optical property of the above-described polarization beam splitter 51, the white display or the black display is achieved in the projector 1, as described later. As described above, however, in a case of the TN-type liquid crystal and a case of the VA-type liquid crystal, there is an inverse relationship at the time when no drive voltage is not applied or at the time when the drive voltage is applied, and in that either the white display or the black display is achieved at that time.

It is to be noted that the light valve 60 is not limited to the liquid crystal panel with use of the above-described TN-type or VA-type liquid crystal, and may include a liquid crystal panel with use of any other method. Specifically, the light valve 60 may include a liquid crystal panel with use of any of methods such as an STN (Super Twisted Nematic) type, an IPS (In-Plane Switching) type, an OCB (Optically Compensated Bend) type, an MVA (Multi-domain Vertical Alignment) type, and an ASM (Axially Symmetric-aligned Microcell) type. Alternatively, the light valve 60 may include a liquid crystal panel with use of smectic liquid crystal (for example, ferroelectric liquid crystal) other than the nematic liquid crystal.

The projection optical system 70 may be disposed between the polarization beam splitter 70 and the screen 2, and may project on the screen 2 the image light that is generated by the light valve 60, and thereafter enters the projection optical system 70 through an optical path passing through the polarization compensation element 80 and the polarization beam splitter 51. Such a projection optical system may include, for example, a single or a plurality of lenses (projection lenses).

[Polarization Compensation Element 80]

The polarization compensation element 80 may be disposed on an optical path between the polarization beam splitter 51 and the light valve 60, and be an element that varies a polarization state of entered light by giving a phase difference to such light. Specifically, to begin with, the polarization compensation element 80 may have a first surface (a light-passing surface on the side of the polarization beam splitter 51) and a second surface (a light-passing surface on the side of the light valve 60) that are opposed to each other along an optical path. The polarization compensation element 80 may give phase differences that are reverse to each other in polarity (opposite directions) and include substantially equivalent absolute values at the time of light entrance from the polarization beam splitter 51 (the above-described first surface) side (a light entrance direction d1) and at the time of light entrance from the light valve 60 (the above-described second surface) side (a light entrance direction d2). In other words, the polarization compensation element 80 may have the phase difference property (symmetric property of the phase difference) that is independent of light entrance directions. As a result, as will hereinafter to be described in detail, light leakage coming into the side of the projection optical system 70 at the time of the black display is reduced owing to summation of the phase difference that is given at the time of light entrance from the polarization beam splitter 51 side in the polarization compensation element 80, the phase difference arising at the time of light modulation in the light valve 60, and the phase difference that is given at the time of light entrance from the light valve 60 side in the polarization compensation element 80.

1.2 Operation and Workings 1.2.1 Basic Operation

In the projector 1, light emitted from each of the light sources 10A, 10B, and 10C in the illuminating optical system 1A may be subjected to polarization split through the polarization beam splitter 51, and one polarized light (for example, S-polarized light) of the light may enter the light valve 60 through the polarization compensation element 80. Further, this incoming light may be modulated by the light valve 60 on the basis of an image signal to generate image light, and the image light may enter the projection optical system 70 through the polarization compensation element 80 and the polarization beam splitter 51. Thereafter, this incoming light may be projected on the screen 2 by the projection optical system 70.

Here, in performing the white display on the basis of the image signal, the operation may be carried out as illustrated in FIG. 2, for example. More specifically, for example, P-polarized light L1$p$ of the light having entered the polarization beam splitter 51 from the illuminating optical system 1A may pass through a polarization split surface Ss directly. On the other hand, for example, S-polarized light L1$s$ may be reflected on the polarization split surface Ss to enter the light valve 60. Here, in performing the white display, no drive voltage is applied when the TN-type liquid crystal is used for the light valve 60, while the drive voltage is applied when the VA-type liquid crystal is used. Therefore, even when any of the TN-type or VA-type liquid crystal is used, the image light that is modulated in the light valve 60, and is reflected to be outputted may be converted into P-polarized light (P-polarized light L2$p$), as described previously. Therefore, the P-polarized light L2$p$ (image light) may pass through the polarization split surface Ss of the polarization beam splitter 51 to be guided to the projection optical system 70 side, thereby projecting the image light. In such a manner, the white display based on the image signal is carried out.

Meanwhile, in performing the black display on the basis of the image signal, the operation may be carried out as illustrated in FIG. 3, for example. More specifically, first, as with the case at the time of the white display as described above, for example, the P-polarized light L1$p$ may pass through the polarization split surface Ss. On the other hand, for example, the S-polarized light L1$s$ may be reflected on the polarization split surface Ss to enter the light valve 60. Here, in performing the black display, the drive voltage is applied when the TN-type liquid crystal is used for the light valve 60, while no drive voltage is applied when the VA-type liquid crystal is used. Therefore, even when any of the TN-type and VA-type liquid crystal is used, the image light that is modulated in the light valve 60, and is reflected to be outputted may be held in a state of S-polarized light (S-polarized light L2$s$), as described previously. Therefore, the S-polarized light L2$s$ may be reflected on the polarization split surface Ss of the polarization beam splitter 51 to be returned back to the illuminating optical system 1A side. That is, in this case, no image light is guided to the projection optical system 70 side, resulting in no image light being projected. In such a manner, the black display based on the image signal may be carried out.

[Regarding Leakage Light at Black Display Time]

Here, at the time of such black display, even when any of the TN-type and VA-type liquid crystal is used for the light valve 60, it is likely that leakage light Lleak traveling from the polarization beam splitter 51 to the projection optical system 70 side will arise, as illustrated in FIG. 3, for example. As described above, since the image light that is generated in the light valve 60 may be the S-polarized light (S-polarized light L2$s$) at the time of the black display, the image light should be totally reflected in the polarization beam splitter 51, and the leakage light Lleak coming into the projection optical system 70 side should not arise in nature.

However, for example, the S-polarized light L1$s$ may be light that is collected by the condenser lens 50, and therefore may also include light of a component that obliquely comes in relative to an entrance surface Sin of the polarization beam splitter 51. As a result, in the image light (S-polarized light L2$s$) equivalent to reflected light of such light of the component, the leakage light Lleak may arise in the following manner. More specifically, such obliquely-incoming light may be seen as a polarization component that is rotated from an axis of the ideal S-polarized light relative to the polarization split surface Ss, and the image light may actually include a component of elliptically-polarized light. Hence, due to inclusion of the component of the elliptically-polarized light, a portion of the image light may not be reflected on the polarization split surface Ss to pass through the polarization split surface Ss, which may cause the leakage light Lleak to occur. In an event of occurrence of such leakage light Lleak, a portion of the image light may be projected on the screen 2 even at the time of the black display, which may lead to deterioration in the contrast, resulting in degradation in the display image quality.

1.2.2 Workings of Polarization Compensation Element

In the projector 1 of the present embodiment, the polarization compensation element 80 may give phase differences that are reverse to each other in polarity (opposite directions) and include substantially equivalent absolute values at the time of light entrance from the polarization beam splitter 51 side (the light entrance direction d1) and at the time of light entrance from the light valve 60 side (the light entrance direction d2). In other words, the polarization compensation element 80 may have the phase difference property (symmetric property of the phase difference) that is independent of light entrance directions. As a result, the light leakage Lleak coming into the side of the projection optical system 70 at the time of the black display is reduced owing to summation of the phase difference that is given at the time of light entrance from the polarization beam splitter 51 side in the polarization compensation element 80, the phase difference arising at the time of light modulation in the light valve 60, and the phase difference that is given at the time of light entrance from the light valve 60 side in the polarization compensation element 80.

Here, with reference to a schematic diagram (a diagram schematically illustrating a change in a polarization state by focusing attention on a certain light beam) as illustrated in FIG. 10, for example, detailed description is provided on the workings of reducing the leakage light Lleak at the time of the black display by summation of the phase differences as described above. First, when S-polarized light (S-polarized light L1$s$ (in)) enters the polarization compensation element 80 from the polarization beam splitter 51, the polarization compensation element 80 may give a phase difference denoted with a rotational direction $\gamma 1$ in the diagram, for example, to output S-polarized light L1$s$ (out). Next, when the S-polarized light L1$s$ (out) that is outputted from the polarization compensation element 80 is modulated and reflected in the light valve 60, a small amount of phase difference (see a rotational direction $\gamma 2$ in the diagram) is given to generate image light (S-polarized light L2$s$ (in)). Thereafter, when the image light (S-polarized light L2$s$ (in)) enters the polarization compensation element 80 once again, a phase difference denoted with a rotational direction $\gamma 3$ that is a reverse direction (reverse polarity) of each of the above-described rotational directions $\gamma 1$ and $\gamma 2$ may be given. With attention focused on a certain light beam in such a manner, image light (S-polarized light L2s (out)) that is outputted from the polarization compensation element 80 may be converted into linear polarized light having the same polarizing axis as that of the original S-polarized light L1s (in). As a result, when entering the polarization beam splitter 51, the image light (S-polarized light L2s (out)) may be totally reflected on the polarization split surface Ss to be returned back to the illuminating optical system 1A side, which reduces or avoids generation of the leakage light Lleak coming into the projection optical system 70 side.

1.2.3 Description of Optical Member for Illumination for Improving Polarization Ratio As described above, when the polarization compensation element 80 is inserted between the polarization beam splitter 51 and the light valve 60, if a polarization ratio (a ratio of S-polarized light to P-polarized light) of light entering the polarization compensation element 80 is deteriorated, this may cause degradation in the contrast. As illustrated in FIG. 12, the polarization compensation element 80 may have similar workings for the P-polarized light as well, as with the case of the S-polarized light (FIG. 10). More specifically, when P-polarized light L1p (in) enters the polarization compensation element 80 from the polarization beam splitter 51, the polarization compensation element 80 may give a phase difference denoted with the rotational direction γ1 in the diagram, for example, to output P-polarized light L1p (out). Next, when the P-polarized light L1p (out) that is outputted from the polarization compensation element 80 is modulated and reflected in the light valve 60, a small amount of phase difference (see the rotational direction γ2 in the diagram) is given to generate P-polarized light L2p (in). Thereafter, when the P-polarized light L2p (in) enters the polarization compensation element 80 once again, a phase difference denoted with the rotational direction γ3 that is a reverse direction (reverse polarity) of each of the above-described rotational directions γ1 and γ2 may be given. With attention focused on a certain light beam in such a manner, light (P-polarized light L2p (out)) that is outputted from the polarization compensation element 80 may be converted into linear polarized light having the same polarizing axis as that of the original P-polarized light L1p (in).

As described above, because the polarization compensation element 80 works on both the P-polarized light and the S-polarized light, if the incoming light L1 entering the polarization compensation element 80 from the polarization beam splitter 51 includes not only the S-polarized light L1s (in) but also the P-polarized light L1p (in) as illustrated in FIG. 13, for example, return light traveling back to the polarization beam splitter 51 may include not only the S-polarized light L2s (out) but also the P-polarized light L2p (out) as well, which may cause degradation in the contrast.

Further, the use of laser with a high polarization ratio for the light sources 10A, 10B, and 10C may be very effective in improving the contrast with use of the polarization compensation element 80 because the high polarization ratio is obtained without inserting a polarizing plate or any other similar optical element. However, even a laser light source with the high polarization ratio may typically have light of a component in an undesired polarization direction, and therefore the contrast improvement effect thereof may be insufficient.

Accordingly, it is preferable to provide one or more of a plurality of optical members for illumination inside the illuminating optical system 1A with the following properties. For example, it is preferable to provide the first optical path combination element 30A with the properties given below. In other words, it is preferable to provide the first optical path combination element 30A with the optical properties that, in combining optical paths, for light at a predetermined wavelength band, guides a first polarized component to a predetermined optical path (an optical path leading to the polarization beam splitter 51 and the light valve 60), and guides a second polarized component toward a direction deviated from the predetermined optical path.

In particular, the first optical path combination element 30A may preferably have the polarizing properties that reflect the first polarized component (S-polarized component $L_G$ (S)) while transmitting the second polarized component (P-polarized component $L_G$ (P)) for light at a first wavelength band (green light $L_G$) serving as the light at the predetermined wavelength band, as illustrated in FIG. 4, for example. Further, the first optical path combination element 30A may preferably have the properties that transmit component of light at a second wavelength band (blue light $L_B$) (S-polarized component $L_B$ (S) and P-polarized component $L_B$ (P)).

In other words, in combining the optical paths, the first optical path combination element 30A may guide the S-polarized component $L_G$ (S) in the green light $L_G$ to the polarization beam splitter 51, and may not guide the P-polarized component $L_G$ (P) to the polarization beam splitter 51. The polarization beam splitter 51 may have the properties of reflecting the S-polarized light and transmitting the P-polarized light; however, may have a slight degree of reflective properties for the P-polarized light. Therefore, if an incoming polarization ratio (a ratio of the S-polarized light to the P-polarized light) is deteriorated, light of both components of the S-polarized light and the P-polarized light may be guided to the light valve 60. However, the first optical path combination element 30A does not guide the P-polarized light to the polarization beam splitter 51 (guides the P-polarized light to an undesired optical path) for at least the green light $L_G$, and therefore the light with the high polarization ratio (having almost only the S-polarized light) may enter the polarization beam splitter 51, resulting in almost only the S-polarized light being guided to the light valve 60 for at least the green light $L_G$.

At the time of the black display, because the polarized light entering the light valve 60 may be outputted as it is without giving any change in the phase, if incoming light entering the light valve 60 has any P-polarized component, the P-polarized component that is outputted from the light valve 60 may pass through the polarization beam splitter 51 to become leakage light. According to the present embodiment, the incoming light entering the light valve 60 may be almost only the S-polarized light for at least the green light $L_G$, and therefore the polarized light that is outputted from the light valve 60 may be also almost only the S-polarized light at the time of the black display, which reduces the leakage light to improve the contrast. Such effects are achieved similarly even when the polarization compensation element 80 is not present.

In the present embodiment, for the light sources 10A, 10B, and 10C, it is possible to use the LD light sources illustrated in FIGS. 5 and 6, or FIGS. 7 to 9, for example, as described above. Typically, the LD light source may have the high polarization ratio in principle; however, some LD light sources may have the properties as illustrated in FIG. 11 in terms of the intensity distribution thereof. Specifically, for the intensity distribution (FFP: Far-Field Pattern) of output light, most of components may be a laser beam of single polarized light in the shape of Gaussian distribution. Such a laser beam may be induced emission light to be outputted from an LD chip, and a polarizing direction thereof may correspond to an S-polarized light of the polarization beam splitter 51: main light in X direction, as illustrated in the diagram on the right side in FIG. 11, for example. The polarization ratio of the S-polarized light to the P-polarized light may be, for example, 1000:1 or more. However, some components other than the above-described main light may exist at other portions such as a sidelobe, and therefore the polarization ratio of a total light flux may be deteriorated to be, for example, 500:1 or less. Examples of components other than the main light may include spontaneous-emission light to be outputted from the LD chip, as well as scattered light or reflective stray light that may be generated due to a packaging factor. The polarizing direction of such components may correspond to a P-polarized light of the polarization beam splitter 51: light in Y direction, or non-polarized light including both of the S- and P-polarized light, as illustrated in the diagram on the right side in FIG. 11, for example. It is to be noted that the diagram on the right side in FIG. 11 illustrates a far-field pattern inside an effective light flux Da in a cross-sectional surface orthogonal to the optical path each of the light sources 10A, 10B, and 10C.

The configuration illustrated in FIG. 4 in the above is effective especially when the LD light source as described above is used. For improvement of the contrast, to ensure that only the S-polarized component corresponding to the polarization beam splitter 51 is transmitted, for example, low-NA design may be made for the coupling lenses 10A, 10B, and 10C to prevent the P-polarized light from being captured. However, for improvement of the light use efficiency, it may be necessary to adopt high-NA design that captures all of light fluxes. If the NA is reduced, desired peripheral light around the S-polarized light may be also not captured, resulting in reduction in the light use efficiency. The use of the configuration illustrated in FIG. 4 in the above allows the polarization ratio to be raised while improving the light use efficiency, which makes it possible to provide a projector that achieves high luminance, low power consumption, and improved contrast.

1.3 Effects

As described thus far, according to the present embodiment, undesired polarized components are guided to the direction deviated from the predetermined optical path with use of the optical members for illumination, which allows for improvement of the contrast. Further, even if each of the light sources 10A, 10B, and 10C is an LD light source with a deteriorated polarization ratio, improvement of the polarization ratio is achievable while performing combination of optical paths, which makes it possible to improve the contrast while maximizing the light use efficiency. In addition, the necessity for adding parts such as a polarizing plate or any other similar optical element to improve the polarization ratio is eliminated, which allows to achieve size reduction, improvement of the light use efficiency, and cost reduction. With such effects, a small-sized, high-luminance, low-power, and high-definition laser projector is achievable that makes it possible to be built into a compact and lightweight electronic apparatus.

It is to be noted that the effects described herein are merely exemplified and non-limiting, and effects of the disclosure may be other effects, or may further include other effects. The same is true for other embodiments and modification examples to be hereinafter described.

1.4 Modification Examples of First Embodiment

1.4.1 First Modification Example

FIG. 14 illustrates a configuration and workings of a single optical member for illumination in a projection display apparatus according to a first modification example. FIG. 4 in the above illustrates an example of the first optical path combination element 30A that includes a polarizing prism as an optical member for illumination to improve the polarization ratio; however, a first optical path combination element 31A that includes a flat-plate polarizing mirror may be used alternatively, as illustrated in FIG. 14. The polarizing properties of the first optical path combination element 31A may be similar to those of the first optical path combination element 30A as illustrated in FIG. 4. In other words, the first optical path combination element 31A may have the polarizing properties that reflect the first polarized component (S-polarized component $L_G$ (S)) while transmitting the second polarized component (P-polarized component $L_G$ (P)) for light at the first wavelength band (green light $L_G$) serving as the light at a predetermined wavelength band. Further, the first optical path combination element 31A may have the properties that transmit component of light at the second wavelength band (blue light $L_B$) (S-polarized component $L_B$ (S) and P-polarized component $L_B$ (P)).

Here, an incoming angle θ of the light at a predetermined wavelength band (green light $L_G$) that enters the first optical path combination element 31A may be preferably at least 25 degrees but no more than 75 degrees. More preferably, the incoming angle θ may be at least 40 degrees but no more than 60 degrees.

FIG. 15 illustrates a configuration example in a case where the incoming angle θ of the light at a predetermined wavelength band with respect to the first optical path combination element 31A is decreased (θ=25), and FIG. 16 illustrates a configuration example in a case where the incoming angle θ is increased (θ=75). FIG. 17 illustrates a difference in the polarizing properties of the first optical path combination element 31A depending on the incoming angle θ. In FIG. 17, a horizontal scale denotes a wavelength, and a vertical scale denotes a reflectance. As an example, FIG. 17 illustrates the properties in cases of the incoming angle θ at 45 degrees, 50 degrees, and 55 degrees.

As the incoming angle θ becomes lower, a bandwidth to be divided into the S-polarized light and the P-polarized light may become smaller, as illustrated in FIG. 17. Therefore, because of restrictions concerning the properties of polarization split, the incoming angle θ of the light at a predetermined wavelength band with respect to the first optical path combination element 31A may be preferably 25 degrees or more, and more preferably may be 40 degrees or more. Further, as the incoming angle θ becomes greater, restrictions concerning arrangement of optical components may arise, as illustrated in FIG. 16. Therefore, the incoming angle θ may be preferably 75 degrees or less, and more preferably may be 60 degrees or less.

Further, as illustrated in FIG. 17, if the incoming angle θ is approximately 55 degrees, sufficient performance may be obtainable for a bandwidth of the green light $L_G$, and therefore it may be preferable to adopt a configuration ensuring that the incoming angle θ becomes approximately 55 degrees, from the characteristic viewpoint of the polarization split.

It is to be noted that such a restriction concerning the incoming angle θ may be similarly applicable to the first optical path combination element 30A that includes a polarizing prism.

1.4.2 Second Modification Example

FIG. 18 illustrates a configuration and workings of two optical members for illumination in a projection display apparatus according to a second modification example. As illustrated in FIG. 18, both the first optical path combination element 30A and the second optical path combination element 30B in the configuration example illustrated in FIG. 1 may be interchanged with a first optical path combination element 31A and a second optical path combination element 31B each of which includes a flat-plate mirror, respectively. The first optical path combination element 31A may be a polarizing mirror having properties similar to those of the configuration example illustrated in FIG. 14. The second optical path combination element 31B may be a dichroic mirror having the properties similar to those of the second optical path combination element 30B in the configuration example illustrated in FIG. 1. In other words, the second optical path combination element 31B may transmit the green light $L_G$ (S-polarized component $L_G$ (S)) and the blue light $L_B$ (S-polarized component $L_B$ (S) and P-polarized component $L_B$ (P)), and may reflect the red light $L_R$ (S-polarized component $L_R$ (S) and P-polarized component $L_R$ (P)), as illustrated in FIG. 18. In such a manner, the second optical path combination element 31B may guide each color light to a predetermined optical path leading to the polarization beam splitter (PBS) 51.

1.4.3 Third Modification Example

FIG. 19 illustrates a configuration and workings of two optical members for illumination in a projection display apparatus according to a third modification example. In the configuration example illustrated in FIG. 18, the second optical path combination element 31B may be additionally provided with the polarizing properties for the red light $L_R$ as a polarizing mirror. In other words, as illustrated in FIG. 19, the second optical path combination element 31B may have the properties that transmit the green light $L_G$ (S-polarized component $L_G$ (S)) and the blue light $L_B$ (S-polarized component $L_B$ (S) and P-polarized component $L_B$ (P)), and that reflect the S-polarized component $L_R$ (S) and transmit the P-polarized component $L_R$ (P) for the red light $L_R$. This makes it possible to improve the polarization ratio for the red light $L_R$.

1.4.4 Fourth Modification Example

FIG. 20 illustrates a configuration and workings of two optical members for illumination in a projection display apparatus according to a fourth modification example. In the configuration example illustrated in FIG. 19, the first optical path combination element 31A may be additionally provided with the polarizing properties for the blue light $L_B$. In other words, as illustrated in FIG. 20, the first optical path combination element 31A may have the polarizing properties that reflect the S-polarized component $L_G$ (S)) and transmit the P-polarized component $L_G$ (P) for the green light $L_G$. In addition, the first optical path combination element 31A may further have the polarizing properties that transmit the S-polarized component $L_G$ (S)) and reflect the P-polarized component $L_G$ (P) for the blue light $L_B$. This makes it possible to improve the polarization ratio for the blue light $L_B$.

1.4.5 Fifth Modification Example

FIG. 21 illustrates a configuration and workings of two optical members for illumination in a projection display apparatus according to a fifth modification example. As illustrated in FIG. 21, the first optical path combination element 31A may be configured as a dichroic mirror having no polarizing properties, and the second optical path combination element 31B may be additionally provided with the polarizing properties for the green light $L_G$ as a polarizing mirror. In other words, the first optical path combination element 31A may have the properties that transmit the blue light $L_B$ (S-polarized component $L_B$ (S) and P-polarized component $L_B$ (P)), and reflect the green light $L_G$ (S-polarized component $L_G$ (S) and P-polarized component $L_G$ (P)). The second optical path combination element 31B may have the properties that reflect the blue light $L_B$ (S-polarized component $L_B$ (S) and P-polarized component $L_B$ (P)); transmit the red light $L_R$ (S-polarized component $L_R$ (S) and P-polarized component $L_R$ (P)); reflect the S-polarized component $L_G$ (S) and transmit the P-polarized component $L_G$ (P) for the green light $L_G$. In this case, the polarization beam splitter (PBS) 51 may be disposed in a direction reflecting the S-polarized component $L_G$ (S) of the green light $L_G$.

It is to be noted that, other than examples described in the second to fifth modification examples, the arrangement of the optical members for illumination may further take a variety of forms.

1.4.6 Sixth Modification Example

In the above-described embodiment, as a configuration example of the light sources, an example is given where the plurality of chips 11A are disposed on a line in longitudinal directions (Y direction and V direction) in a plane including the Y axis (FIGS. 5 and 6). On the contrary, a configuration may be employed in which the plurality of chips 11A are configured to be disposed on a line in lateral directions (X direction and H direction) in a plane including the X axis, as illustrated in FIGS. 22 and 23. Further, in the above-described embodiment, an example is given where the single chip 11A is disposed in a plane including the Y axis (FIGS. 7 to 9). On the contrary, a configuration may be employed in which the single chip 11A is disposed in a plane including the X axis, as illustrated in FIGS. 24 to 26.

It is to be noted that FIG. 23 illustrates the light source illustrated in FIG. 22 as viewed from the light-output-surface side. FIG. 25 illustrates the light source illustrated in FIG. 24 as viewed from the light-output-surface side. FIG. 26 illustrates another configuration example of the light source illustrated in FIG. 24.

In the present modification example, when the solid-state light-emitting device 11 includes the single chip 11A, a size ($W_V \times W_H$) serving as the solid-state light-emitting device 11 may be equal to a size ($W_{V1} \times W_{H1}$) of the single chip 11A, as illustrated in FIG. 25, for example. However, as illustrated in an example in FIG. 26, when the solid-state light-emitting device 11 adopts a monolithic structure, the size is as follows. That is, in an example in FIG. 26, the size ($W_V \times W_H$) of the solid-state light-emitting device 11 may be equal to or greater than $W_{V1} \times 2W_{H1}$. On the other hand, when the solid-state light-emitting device 11 includes the plurality of chips 11A, the size of the solid-state light-emitting device 11 may be equal to a size measured when all of the chips 11A are lumped together, as illustrated in FIG. 23, for example. When the plurality of chips 11A are disposed on a line in a lateral direction, the size ($W_V \times W_H$) of the solid-state light-emitting device 11 may be equal to or greater than $W_{V1} \times 3W_{H1}$ in an example in FIG. 23.

2. Second Embodiment

Next, the description is provided on a second embodiment of the disclosure. Hereinafter, for any component parts having the configuration and workings similar to those of the above-described first embodiment, the related descriptions are omitted as appropriate.

FIG. 27 illustrates a configuration example of a projector 3 that serves as a projection display apparatus according to the present embodiment. FIG. 28 illustrates a configuration and workings of a single optical member for illumination (first optical path combination element 30A) in the projector 3 illustrated in FIG. 27.

As illustrated in FIG. 27, it may be also possible to dispose the light valve 60 at a position that is different by 90 degrees relative to a position specified in the above-described first embodiment. In this case, the light having passed through the polarization beam splitter 51 may be guided to the light valve 60. As with the above-described first embodiment, the polarization beam splitter 51 may have the properties of reflecting the S-polarized light L1s, and transmitting the P-polarized light L1p. Therefore, a polarizing direction of the light entering the light valve 60 may correspond to the P-polarized light, and the properties of the optical path combination element 30 may be configured to ensure a state where a relationship between the S-polarized light and the P-polarized light is interchanged with such a relationship in the above-described first embodiment.

The first optical path combination element 30A may preferably have the polarizing properties that reflect a first polarized component (P-polarized component $L_G$ (P)) while transmitting a second polarized component (S-polarized component $L_G$ (S)) for light at a first wavelength band (green light $L_G$) serving as the light at a predetermined wavelength band, as illustrated in FIG. 28, for example. Further, the first optical path combination element 30A may preferably have the properties that transmit component of light at a second wavelength band (blue light $L_B$) (S-polarized component $L_B$ (S) and P-polarized component $L_B$ (P)).

In other words, a relationship between the S-polarized light and the P-polarized light may be interchanged with such a relationship in the above-described first embodiment. That is, in combining optical paths, the first optical path combination element 30A may guide the P-polarized component $L_G$ (P) in the green light $L_G$ to the polarization beam splitter 51, and may not guide the S-polarized component $L_G$ (S) to the polarization beam splitter 51.

3. Third Embodiment

Next, the description is provided on a third embodiment of the disclosure. Hereinafter, for any component parts having the configuration and workings similar to those of the above-described first embodiment or second embodiment, the related descriptions are omitted as appropriate.

FIG. 29 illustrates a configuration example of the projector 3 that serves as a projection display apparatus according to the present embodiment. FIG. 30 illustrates a configuration and workings of a single optical member for illumination (first optical path combination element 30A) in the projector 3 illustrated in FIG. 29.

It may be possible to dispose the plurality of light sources (first light source 10A, second light source 10B, and third light source 10C) in a different manner from the configuration examples described thus far. Each of FIG. 29 and FIG. 30 illustrates a configuration in which the arrangement of the first light source 10A and the second light source 10B is interchanged with such an arrangement in the configuration example each in FIG. 27 and FIG. 28. In this case, the first optical path combination element 30A may preferably have the polarizing properties that transmit a first polarized component (P-polarized component $L_G$ (P)) while reflecting a second polarized component (S-polarized component $L_G$ (S)) for light at a first wavelength band (green light $L_G$) serving as the light at a predetermined wavelength band, as illustrated in FIG. 30, for example. Further, the first optical path combination element 30A may preferably have the properties that reflect component of light at a second wavelength band (blue light $L_B$) (S-polarized component $L_B$ (S) and P-polarized component $L_B$ (P)).

4. Fourth Embodiment

Next, the description is provided on a fourth embodiment of the disclosure. Hereinafter, for any component parts having the configuration and workings similar to those of the above-described first embodiment to the third embodiment, the related descriptions are omitted as appropriate.

FIG. 31 illustrates a configuration example of an illuminating optical system 1B in a projection display apparatus according to the present embodiment. Inside the illuminating optical system 1B, a polarizing mirror 32 that bends an optical path toward the polarization beam splitter 51 may be provided as an optical member for illumination, as illustrated in FIG. 31. The polarizing mirror 32 may have the optical properties that guide a first polarized component (for example, S-polarized component) to a predetermined optical path and guide a second polarized component (for example, P-polarized component) toward a direction deviated from the predetermined optical path, for light at a predetermined wavelength band (for example, one or more of the red light $L_R$, green light $L_G$, and blue light $L_B$). It is to be noted that FIG. 31 illustrates an example where the polarizing mirror 32 reflects each of the S-polarized components $L_R$ (S), $L_G$ (S), and $L_B$ (S) toward the polarization beam splitter 51, and transmits each of the P-polarized components $L_R$ (P), $L_G$ (P), and $L_B$ (P) of the red light $L_R$, green light $L_G$, and blue light $L_B$, respectively toward a different direction from the polarization beam splitter 51.

5. Fifth Embodiment

Next, the description is provided on a fifth embodiment of the disclosure. Hereinafter, for any component parts having the configuration and workings similar to those of the above-described first embodiment to the fourth embodiment, the related descriptions are omitted as appropriate.

FIG. 32 illustrates a configuration example of a projector 5 that serves as a projection display apparatus according to the present embodiment. FIG. 33 illustrates a configuration and workings of a single optical member for illumination (first optical path combination element 30A) in the projector 5 illustrated in FIG. 32.

The projector 5 according to the present embodiment may have a mirror 33 that bends an optical path toward the polarization beam splitter 51 inside an illuminating optical system 1C. Further, in the projector 5, the arrangement of the first light source 10A and the second light source 10B relative to the first optical path combination element 30A may be different from such an arrangement in the configuration example illustrated in FIG. 1.

In the above-described first embodiment to the fourth embodiment, optical paths from the light sources to the light valve 60 that is located at a predetermined illuminating position may be present on the same plane. In the projector 5, however, an optical path leading to the light valve 60 may be bent toward another plane direction by a polarization split surface of the polarization beam splitter 51, and the optical paths from the light sources to the light valve 60 may be not present on the same plane.

When the optical path is bent as illustrated in FIG. 32, the first optical path combination element 30A may preferably have the polarizing properties that transmit a first polarized component (S-polarized component $L_G$ (S)) while reflecting a second polarized component (P-polarized component $L_G$ (P)) for light at a first wavelength band (green light $L_G$) serving as the light at a predetermined wavelength band, as illustrated in FIG. 33. Further, the first optical path combination element 30A may preferably have the properties that reflect component of light at a second wavelength band (blue light $L_B$) (S-polarized component $L_B$ (S) and P-polarized component $L_B$ (P)).

It is to be noted that, in the above-described first embodiment to the fourth embodiment, the first polarized component may be the S-polarized component (or the P-polarized component) with respect to the polarization beam splitter 51, and the S-polarized component (or the P-polarized component) with respect to the optical path combination element 30 as well. On the contrary, the present embodiment is different from any of the above-described first embodiment to the fourth embodiment in that there is a relationship where the first polarized component may be the S-polarized component (or the P-polarized component) with respect to the polarization beam splitter 51, and the P-polarized component (or the S-polarized component) with respect to the optical path combination element 30.

It is to be noted that, also in the present embodiment, the optical path combination element 30 may be a polarizing mirror, as with any of the above-described first embodiment to the fourth embodiment. Further, in an example in FIG. 32, light reflected by the polarization beam splitter 51 is made to enter the light valve 60; however, a configuration in which light passing through the polarization beam splitter 51 is made to enter the light valve 60 may be adopted, as with the second or third embodiment.

Other than the methods mentioned in the above-described respective embodiments, a variety of approaches may be considered for a method of bending optical paths from the light sources to the light valve 60. In any method, a direction of a first polarized component may be defined as a direction of a polarized component with respect to a polarization split element (the polarization beam splitter 51). Further, in the above descriptions, it is assumed that the polarization split element has the properties of reflecting the S-polarized light and transmitting the P-polarized light. However, the polarization split element may have the properties of transmitting the S-polarized light and reflecting the P-polarized light.

6. Other Example Embodiments

The technology of the disclosure is not limited to the descriptions of the above-described respective example embodiments, but various modifications may be made.

For example, the illuminating unit according to the technology is also applicable to any apparatus involving illumination apart from a projector. Further, the illuminating unit is applicable even in a case of a single light source instead of a plurality of light sources. When the single light source is used, the optical path combination element 30 is unnecessary, and therefore a configuration using a polarizing mirror that bends an optical path may be adopted in the same manner as the configuration example illustrated in FIG. 31, for example.

Further, for example, the technology may be configured as follows.

(1)

An illuminating unit including:

a light source;

a plurality of optical members for illumination that guide light from the light source to a predetermined optical path; and a polarization split element that transfers, to a predetermined illuminating position, a first polarized component included in the light guided to the predetermined optical path, wherein one or more of the plurality of optical members for illumination have optical properties, for the light at a predetermined wavelength band outputted from the light source, of guiding the first polarized component to the predetermined optical path, and guiding a second polarized component that is different from the first polarized component toward a direction deviated from the predetermined optical path.

(2)

The illuminating unit according to (1), wherein the light source includes a plurality of light sources that are disposed on different optical paths from each other, the plurality of optical members for illumination include an optical path combination element that combines the optical paths of two or more of the plurality of light sources, and in combining the optical paths, the optical path combination element has optical properties, for the light at the predetermined wavelength band, of guiding the first polarized component to the predetermined optical path, and guiding the second polarized component toward the direction deviated from the predetermined optical path.

(3)

The illuminating unit according to (2), wherein the first polarized component is S-polarized light with respect to the polarization split element, and the second polarized component is P-polarized light with respect to the polarization split element.

(4)

The illuminating unit according to (3), wherein the optical path combination element has polarizing properties of reflecting the first polarized component and transmitting the second polarized component for light at a first wavelength band serving as the light at the predetermined wavelength band, and has properties of transmitting light at a second wavelength band.

(5)

The illuminating unit according to (3), wherein the optical path combination element has polarizing properties of transmitting the first polarized component and reflecting the second polarized component for light at a first wavelength band serving as the light at the predetermined wavelength band, and has properties of reflecting light at a second wavelength.

(6)

The illuminating unit according to any one of (3) to (5), wherein the polarization split element transfers the first polarized component to the predetermined illuminating position by reflection.

(7)

The illuminating unit according to (2), wherein the first polarized component is P-polarized light with respect to the polarization split element, and the second polarized component is S-polarized light with respect to the polarization split element.

(8)

The illuminating unit according to (7), wherein the optical path combination element has polarizing properties of reflecting the first polarized component and transmitting the second polarized component for light at a first wavelength band serving as the light at the predetermined wavelength band, and has properties of transmitting light at a second wavelength band.

(9)

The illuminating unit according to (7), wherein the optical path combination element has polarizing properties of transmitting the first polarized component and reflecting the second polarized component for light at a first wavelength band serving as the light at the predetermined wavelength band, and has properties of reflecting light at a second wavelength.

(10)

The illuminating unit according to any one of (7) to (9), wherein the polarization split element transfers the first polarized component to the predetermined illuminating position by transmission.

(11)

The illuminating unit according to any one of (2) to (4), (6) to (8), and (10), wherein an incoming angle of the light at the predetermined wavelength band that enters the optical path combination element from the light source is at least 25 degrees but no more than 75 degrees.

(12)

A projection display apparatus including:
   a light source;
   a plurality of optical members for illumination that guide light from the light source to a predetermined optical path;
   a polarization split element that transfers, to a predetermined illuminating position, a first polarized component included in the light guided to the predetermined optical path;
   a light valve that is disposed at the predetermined illuminating position and modulates light on the basis of image data; and
   a projection lens that projects, on a projection surface, the modulated light from the light valve,
   wherein one or more of the plurality of optical members for illumination have optical properties of, for light at a predetermined wavelength band outputted from the light source, guiding the first polarized component to the predetermined optical path, and guiding a second polarized component that is different from the first polarized component toward a direction deviated from the predetermined optical path.

This application claims the benefit of Japanese Priority Patent Application No. 2014-189019 filed with Japan Patent Office on Sep. 17, 2014, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An illuminating unit, comprising:
   a light source;
   a plurality of optical members for illumination configured to guide light from the light source to a first optical path, wherein the plurality of optical members for illumination comprise an optical path combination element; and
   a polarization split element configured to transfer a first polarized component to an illuminating position, wherein:
      the first polarized component is included in the light guided to the first optical path,
      at least one of the plurality of optical members for illumination have optical properties, for the light at a first wavelength band outputted from the light source, to guide the first polarized component to the first optical path, and to guide a second polarized component toward a direction deviated from the first optical path,
      the second polarized component is different from the first polarized component,
      the first polarized component is P-polarized light with respect to the polarization split element, and the second polarized component is S-polarized light with respect to the polarization split element,
      the optical path combination element has polarizing properties to transmit the first polarized component and to reflect the second polarized component for the light at the first wavelength band, and
      the optical path combination element further has properties to reflect light at a second wavelength.

2. The illuminating unit according to claim 1, wherein:
   the light source comprises a plurality of light sources that are disposed on different optical paths,
   the optical path combination element is configured to combine the different optical paths of at least two of the plurality of light sources, and
   the optical path combination element has the optical properties, for the light at the first wavelength band, to transmit the first polarized component to the first optical path, and to reflect the second polarized component toward the direction deviated from the first optical path.

3. The illuminating unit according to claim 2, wherein the polarization split element is further configured to transfer the first polarized component to the illuminating position by reflection.

4. The illuminating unit according to claim 2, wherein the polarization split element is further configured to transfer the first polarized component to the illuminating position by transmission.

5. The illuminating unit according to claim 1, wherein an incoming angle, with respect to a perpendicular on an incidence surface of the optical path combination element, of the light at the first wavelength band that enters the optical path combination element from the light source is in a range of 25 degrees to 75 degrees.

6. A projection display apparatus, comprising:
   a light source;
   a plurality of optical members for illumination configured to guide light from the light source to a first optical path, wherein the plurality of optical members for illumination comprise an optical path combination element;

a polarization split element configured to transfer a first polarized component to an illuminating position, wherein the first polarized component is included in the light guided to the first optical path;

a light valve at the illuminating position, wherein the light valve is configured to modulate the light based on image data; and a projection lens configured to project the modulated light from the light valve onto a projection surface, wherein:

at least one of the plurality of optical members for illumination have optical properties, for the light at a first wavelength band outputted from the light source, to guide the first polarized component to the first optical path, and to guide a second polarized component toward a direction deviated from the first optical path, the second polarized component is different from the first polarized component, the first polarized component is P-polarized light with respect to the polarization split element, and the second polarized component is S-polarized light with respect to the polarization split element, the optical path combination element has polarizing properties to transmit the first polarized component and to reflect the second polarized component for the light at the first wavelength band, and the optical path combination element further has properties to reflect light at a second wavelength.

7. An illuminating unit, comprising:

a light source;

a plurality of optical members for illumination configured to guide light from the light source to a first optical path, wherein the plurality of optical members for illumination comprise an optical path combination element; and a polarization split element configured to transfer a first polarized component to an illuminating position, wherein the first polarized component is included in the light guided to the first optical path, wherein:

at least one of the plurality of optical members for illumination have optical properties, for the light at a first wavelength band outputted from the light source, to guide the first polarized component to the first optical path, and to guide a second polarized component toward a direction deviated from the first optical path, the second polarized component is different from the first polarized component, the first polarized component is P-polarized light with respect to the polarization split element, and the second polarized component is S-polarized light with respect to the polarization split element, the optical path combination element has polarizing properties to reflect the first polarized component and to transmit the second polarized component for light at the first wavelength band, and the optical path combination element further has properties to transmit light at a second wavelength band.

* * * * *